US007669227B2

(12) United States Patent
Malcolm

(10) Patent No.: US 7,669,227 B2
(45) Date of Patent: *Feb. 23, 2010

(54) INFORMATION MANAGEMENT SYSTEM

(75) Inventor: Peter Bryan Malcolm, Okehampton (GB)

(73) Assignee: Computer Associates Think, Inc., Islandia, NY (US)

( * ) Notice: Subject to any disclaimer, the term of this patent is extended or adjusted under 35 U.S.C. 154(b) by 957 days.

This patent is subject to a terminal disclaimer.

(21) Appl. No.: 11/127,675

(22) Filed: May 12, 2005

(65) Prior Publication Data

US 2005/0203855 A1 Sep. 15, 2005

Related U.S. Application Data

(62) Division of application No. 09/923,704, filed on Aug. 7, 2001, now Pat. No. 7,333,956.

(30) Foreign Application Priority Data

Nov. 8, 2000 (GB) ................................. 0027280.7

(51) Int. Cl.
*H04L 9/00* (2006.01)
*H04L 9/32* (2006.01)
(52) U.S. Cl. ........................... 726/1; 713/150; 713/162; 713/189
(58) Field of Classification Search ................. 726/1–4, 726/7–15, 21, 26–30; 713/173, 175, 193, 713/150, 162, 168, 189; 705/50, 64, 75–78
See application file for complete search history.

(56) References Cited

U.S. PATENT DOCUMENTS 5,235,642 A 8/1993 Wobber et al.

(Continued)

FOREIGN PATENT DOCUMENTS

EP 0736827 10/1996

(Continued)

OTHER PUBLICATIONS

Abrams, M. et al. "A Higher Level of Computer Security through Active Policies," Computers & Security, 14 (1995) pp. 147-157.

(Continued)

*Primary Examiner*—Hosuk Song
(74) *Attorney, Agent, or Firm*—Baker Botts L.L.P.

(57) ABSTRACT

An information management system is described comprising one or more workstations running applications to allow a user of the workstation to connect to a network, such as the Internet. Each application has an analyzer, which monitors transmission data that the application is about to transmit to the network or about to receive from the network and which determines an appropriate action to take regarding that transmission data. Such actions may be extracting data from the transmission data, such as passwords and usernames, digital certificates or eCommerce transaction details for storage in a database; ensuring that the transmission data is transmitted at an encryption strength appropriate to the contents of the transmission data; determining whether a check needs to be made as to whether a digital certificate received in transmission data is in force, and determining whether a transaction about to be made by a user of one of the workstations needs third party approval before it is made. The analyzer may consult a policy data containing a policy to govern the workstations in order to make its determination. The information management system provides many advantages in the eCommerce environment to on-line trading companies, who may benefit by being able to regulate the transactions made by their staff according to their instructions in a policy data, automatically maintain records of passwords and business conducted on-line, avoid paying for unnecessary checks on the validity of digital certificates and ensure that transmissions of data made by their staff are always protected at an agreed strength of encryption.

116 Claims, 18 Drawing Sheets

U.S. PATENT DOCUMENTS

| | | | |
|---|---|---|---|
| 5,701,484 A | | 12/1997 | Artsy |
| 5,740,355 A | | 4/1998 | Watanabe et al. |
| 5,835,726 A | * | 11/1998 | Shwed et al. ............... 709/229 |
| 5,903,882 A | | 5/1999 | Asay et al. |
| 5,917,489 A | | 6/1999 | Thurlow et al. |
| 5,944,787 A | | 8/1999 | Zoken |
| 5,964,839 A | | 10/1999 | Johnson et al. |
| 5,974,149 A | | 10/1999 | Leppek |
| 5,987,611 A | | 11/1999 | Freund |
| 6,006,333 A | | 12/1999 | Nielsen |
| 6,009,173 A | | 12/1999 | Sumner |
| 6,009,526 A | | 12/1999 | Choi |
| 6,073,142 A | | 6/2000 | Geiger et al. |
| 6,085,224 A | | 7/2000 | Wagner |
| 6,141,686 A | | 10/2000 | Jackowski et al. |
| 6,359,557 B2 | | 3/2002 | Bilder |
| 7,017,187 B1 | | 3/2006 | Marshall et al. |
| 2002/0087645 A1 | | 7/2002 | Ertugrul et al. |
| 2003/0140282 A1 | | 7/2003 | Kaler et al. |

FOREIGN PATENT DOCUMENTS

| | | |
|---|---|---|
| EP | 0817099 A2 | 1/1998 |
| EP | 0959419 A2 | 11/1999 |
| GB | 2247549 A | 3/1992 |
| GB | 2295299 | 5/1996 |
| GB | 2 339 938 | 2/2000 |
| JP | 07-154615 | 6/1995 |
| JP | 2000-235540 | 8/2000 |
| JP | 2000-278260 | 10/2000 |
| JP | 2007072526 | 3/2007 |
| WO | WO-99/67931 | 12/1999 |
| WO | WO-00/68811 | 11/2000 |
| WO | WO-01/27813 | 4/2001 |
| WO | WO-01/39023 | 5/2001 |

OTHER PUBLICATIONS

Boone, G., "Concept Features in Re: Agent, and Intelligent Email Agent," Proceedings of the 2nd International Conference of the 2nd International Conference on Autonomous Agents/St. Paul, MN, May 1998, pp. 141-148.

Esposito, D. (Jan. 1999) "Browser Helper Objects: The Browser the Way You Want It" Microsoft Corporation, retrieved from http://msdn.Microsoft.com/library/techart/bho.htm.

Grimm, R. et al. (1996) Security Policies in OSI-Management Experiences from the.

Hurwitz Group, "Managing Exchange 2000 Migration with Bindview," www.Hurwitz.com, Oct. 2000, pp. 1-15.

Lloyd, S., (1998) "Microsoft Outlook and Exchange Client Extensions".

Rothman, M., (2000) "Email Security: the PKI Way," www.comnews.com, p. 1.

Satchell, S., "Keeping E-Mail Secure," www.106.ibm., Oct. 2000, pp. 1-4.

Schlosser, M., "IBM Application Framework for E-business: Security," www.4.ibm.com, Nov. 1999, pp. 1-8.

Takkinen, J., et al., (1998) "Cafe: A Conceptual Model for Managing Information in Electronic Mail," Proceedings of the Annual Hawaii International Conference on System Sciences, pp. 44-53.

Hamilton, "Visual Basic Shell Programming," Jul. 2000, O'Reilly & Associates, Inc., Sebastopol, CA, 1st Edition, Chapter 12.

Muller, "Desktop Encyclopedia of the Internet," 1999, Artech House, Inc., Norwood, MA, all pages.

Examiners Report No. 4 issued for corresponding Australian Patent Application No. 2002212549 mailed Feb. 25, 2009.

Norio Miya, "Network solution course. How to use practically mail filtering," Nikkei Communications, Japan, Nikkei Business Publication, Inc., Jul. 3, 2000, No. 321, pp. 148-153.

Miwa, "Two piece of security software preventing intrusion from outside," Monthly ASCII, Japan, ASCII Corporation, vol. 24, No. 10, pp. 266-267 (translator's note: this reference ws published on Oct. 1, 2000 according the last page of the copy of this reference.

White, R., "How Computers Work," Millennium Ed., Que Corporation, Indianapolis, IN, 1999.

* cited by examiner

Policy
└── DigitalCertificates
    └── AcceptanceConfidenceRating
        ├── IdentityCertificates
        │   ├── AlwaysAcceptFrom=[table a]
        │   ├── AlwaysCheckFrom=[table b]
        │   ├── CheckIfDaysSinceCertificateReceivedFromCompany=10
        │   └── CheckIfDaysSinceLastReceivedThisCertificate=30
        └── MonetaryCertificates
            ├── AlwaysAcceptFrom=[table x]
            ├── AlwaysCheckFrom=[table y]
            ├── CheckIfAmountExceeds=10000
            └── IfRecentlyChecked
                ├── DaysSinceLastChecked=30
                └── MaximumAmount=5000

Fig. 10

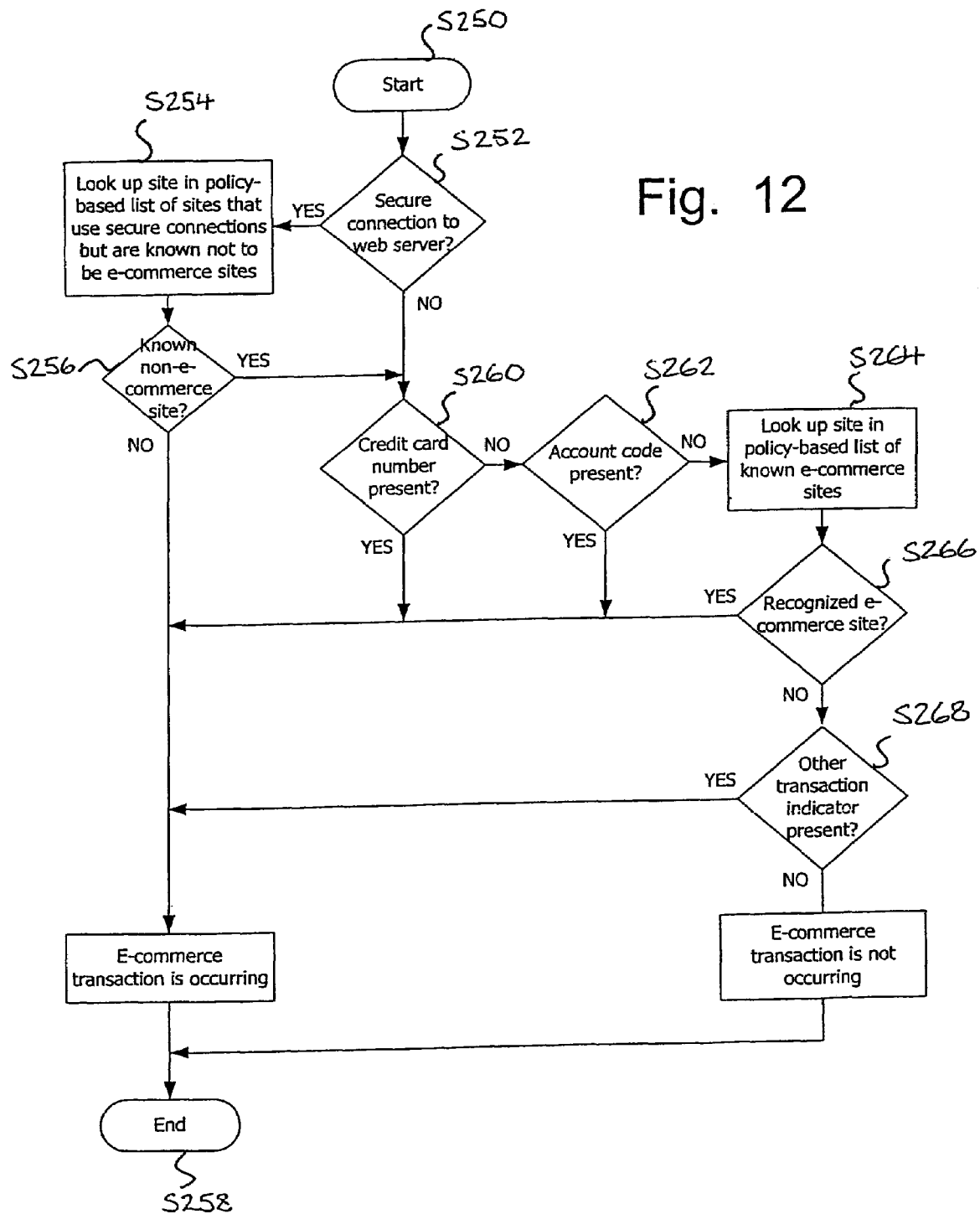

```
Policy
 └─ Transactions
      ├─ Identification
      │    ├─ IfConnectionGoesSecure=Yes
      │    │    └─ ExcludedSites=[table q]
      │    ├─ IfCreditCardNumberPresent=Yes
      │    │    └─ PreviousPages=2
      │    ├─ IfAccountCodePresent=Yes
      │    │    └─ AccountCodes=[table r]
      │    ├─ IfKnownECommerceSite=Yes
      │    │    └─ KnownSites=[table s]
      │    └─ IfOtherIndicatorPresent=Yes
      │         ├─ Keywords=[table t]
      │         └─ PreviousPages=6
      └─ Termination
           ├─ If ConnectionGoesInsecure=Yes
           ├─ WhenSiteChanges=Yes
           ├─ IfDigitalReceiptReceived=Yes
           └─ AfterNumberOfPages=20
```

| Table q - Excluded Sites |
|---|
| www.hotmail.com |
| www.passport.com |
| ibankon.barclays.co.uk |
| www.nwolb.co.uk |

| Table r - Account Codes | |
|---|---|
| Account Code | Previous Pages To Record |
| 21321234 | 2 |
| ORCH01 | 6 |
| 58734 | 1 |
| PETER304 | 0 |

| Table s - Known eCommerce Sites |
|---|
| ecomm.us.dell.com/dellstore |
| buy.supersaver.co.uk |
| www.booksforall.com/basket |

| Table t - Keywords |
|---|
| "receipt" |
| "thank you for your order" |
| "order confirmation" |

Fig. 13

Policy
└── TransactionApproval
    ├── MaximumUnapprovedTransactionAmount=500
    ├── MaximumUnapprovedMonthlyAmount=2500
    ├── ExcludedSites=[table e]
    └── Approvers=[table f]

| Table f - Approvers | | |
|---|---|---|
| Username | Limit | Excluded Sites |
| F Smith | $500 | www.dell.com |
| R Jones | $1000 | www.dell.com; www.officemax.com |
| F Healy | Unlimited | none |

Fig. 16

```
Policy
  └─ TransmittedDataSecurity
       └─ RequiredEncryptionLevel
            ├─ Passwords=40
            ├─ CreditCardNumbers
            │    ├─ Company=128
            │    └─ Personal=128
            ├─ SubmittedKeywords=40
            └─ OtherSubmittedData=None
```

Fig. 17

INFORMATION MANAGEMENT SYSTEM

RELATED APPLICATION

This application is a divisional of pending U.S. application Ser. No. 09/923,704, filed Aug. 7, 2001, claiming priority to GB 0027280.7 filed Nov. 8, 2000 in Great Britain, both of which are incorporated herein by reference in their entirety.

BACKGROUND OF THE INVENTION

This invention relates to the provision of extended management functionality for Internet applications, particularly in the areas of information security, transaction auditing and reporting, centralized policy, and application connectivity.

Electronic commerce ("eCommerce"), particularly between businesses ("B2B"), but also between business and consumers ("B2C"), is a fast growing market where buyers and sellers communicate using the Internet, a worldwide network of linked computer systems, instead of by traditional means such as mail, telephone and personal meetings. Sellers advertise products and services using digital brochures and catalogues, which can be viewed or downloaded via an Internet connection, through pages on the World Wide Web, or via electronic marketplaces typically dealing in the goods and services of a particular market sector. Buyers can find suppliers, select goods, obtain quotations, place and track orders, and even make payments entirely electronically and at any time. eCommerce brings the promise of increased flexibility, choice and efficiency, with dramatically reduced procurement costs.

There are two universally accepted means of interfacing users to the Internet. The first of these is the 'Web Browser'; which allows users to view pages on the World Wide Web by accessing individual web sites, the addresses of which are typically widely published either using traditional means, or are referenced in another web site. The most widely adopted web browser is Microsoft Corporation's "Internet Explorer".

The second means of interfacing is using an Electronic Mail program, with which the user composes a message, known as an e-mail, which is then electronically routed to the address of the intended recipient over the Internet. Well known Electronic Mail programs include IBM Corporation's "Lotus Notes" and Microsoft Corporation's "Outlook".

In a typical eCommerce scenario, a buyer might identify a particular product, together with pricing and delivery information, on the sellers' web site. He may then place an order, either by filling in an electronic order form on the web site, or by sending an e-mail directly to the seller. The order would typically include a commitment to payment, perhaps in the form of Credit Card details, or by some electronic payment means. The seller would then typically send a return e-mail to confirm acceptance of the order.

Web Browsers operate in accordance with recognized standards, in particular Hyper Text Transfer Protocol ("HTTP"), described fully in Internet standards document RFC2616. Electronic Mail programs operate in accordance with recognized standards, in particular Simple Mail Transfer Protocol ("SMTP"), described fully in Internet standards document RFC0821 and Multipurpose Internet Mail Extensions ("MIME") described fully in Internet standards documents RFC2045-2049.

While eCommerce provides enormous benefits, its adoption raises many new issues, which must be addressed in order to ensure its continued adoption, particularly if it is to ultimately replace traditional methods. One of the central issues is security.

The Internet is an open communications network, which is by definition insecure since anyone can use it.

Means to secure sensitive information to be exchanged over the Internet (for example in an eCommerce transaction) have been provided by the adoption of secure transmission protocols and messaging. Secure point to point transmission protocols, used for example between a web Server and a web Browser, include the 'Secure Socket Layer' ("SSL"), defined by Netscape Communications Corporation, and its successor 'Transport Layer Security' ("TLS") defined in Internet standards document RFC2246. Secure e-mail message standards include 'Secure Multipurpose Internet Mail Extensions' ("S/MIME") described fully in Internet standards document RFC2633 and "Pretty Good Privacy" a public domain secure messaging system developed by Philip Zimmerman.

In order to control access to information on servers connected to the Internet, a system of usernames and passwords has been widely adopted. For example, access to discounted price lists on a particular web server may be restricted to trade users who have previously been given a username and password allowing them access. Similarly, on-line information services typically make extensive use of usernames and passwords to restrict access to those who have paid for the service. By providing each user with a unique username and a changeable password, the service can ensure that only paid subscribers can access the system, and allow users to prevent access by others to their personal data stored by the service.

In eCommerce applications, a major problem is the issue of identity and trust. When a supplier receives an order via the Internet it is perfectly possible, even likely, that he has no prior knowledge of the customer. The supplier must establish that the customer is a) who he says he is, in other words that he is not masquerading as someone else, and that b) he is to be trusted and will ultimately pay for the goods or service to be supplied. These issues have been addressed in the B2C market principally by the use of credit cards. The customer provides his credit card number and address with the order, which the supplier then verifies with the credit card company, and obtains authorization for the charge. The entire process is typically carried out on-line without human intervention. This method is largely effective where a supplier ships goods to the cardholder address, since a potential thief would not only need to steal the cardholders details, but would also need to intercept delivery of the goods. It is much less effective in the case of services where no physical delivery is involved.

Clearly, the use of credit cards in eCommerce, though widespread, is restricted to small-scale transactions potentially involving amounts, say, up to $10,000. For those transactions above such amounts (which in aggregate monetary terms far exceed those below them), a mutually trusted third party must be used to establish both identity and trust.

Central to establishing identity is the use of Digital Certificates. The customer can be issued with a Digital Certificate by a trusted third party, which is then used to electronically 'sign' communications. On receipt of a signed message, the recipient (in this case the supplier) can positively establish a) the identity of the sender, b) that the message has not been altered, and c) that the sender cannot subsequently deny he sent the message. Recognized standards for Digital Certificates are described in ITU document X.509, and their use in Internet communications in Internet standards documents RFC2312, RFC2459, RFC2510, RFC2511, RFC2527, RFC2560, RFC2585 and RFC2632.

Chargeable, Third party services, such as that provided by Valicert Inc., can be used to verify that a Digital Certificate has not been revoked, for example after the certificate has been compromised in some way.

Once authenticity of messages is established, the supplier can use another third party to establish trust, or the same third party can be used to establish both authenticity and trust. For example 'Identrus', a consortium of the world's major banks, provide a system such that when a supplier receives a message signed with an Identrus issued Digital Certificate, he can independently verify that the customer is a valid account holder in good standing with a recognized bank.

Ultimately the system is to be extended such that the bank will additionally warrant the transaction, thereby guaranteeing payment to the supplier. It will be appreciated that the terms 'customer' and 'supplier' can apply to any two parties engaged in Internet communication.

It can be seen that appropriate combinations of the systems described provide a secure foundation for use of the Internet and the services and functions available through it. However, we have appreciated that there are a number of problems with conducting eCommerce using only these systems. These problems are discussed below.

In the secure transmission protocols and messaging referred to above, data is usually encrypted before transmission and decrypted by the intended recipient prior to viewing. Thus, should the data be intercepted during transmission, it will be safe from viewing by unauthorised third parties unless they know or can ascertain the secret encryption key of the encryption algorithm.

The encryption and decryption of data at each end of a secure link or message requires significant processing power. Additionally both transmitting and receiving parties must be in possession of the same encryption key of the encryption algorithm, at the same cryptographic strength, in order for the system to operate successfully. This often presents a problem, for example where regulations for the import or export of data into or out of a computer system prohibit the use of higher strength algorithms, forcing the link or message to be encrypted at a lower cryptographic strength, or preventing secure communications at all. Consequently, secure links and messaging are typically used only when necessary.

In the case of communications over the World Wide Web, the requirement to secure transmissions is determined and initiated by the web Server. If, for example, the server is about to transmit an order form for completion by the user it may initiate a secure link such that the order information will be encrypted when transmitted back to the server. Similarly, once the order is complete the server may terminate the secure link and return to normal unencrypted communication.

Typically, the only indication the user has that a link has been secured is an icon (usually depicting a padlock), which appears in the browser window. Once the icon has appeared, the user can then typically interrogate the browser to determine the strength of the encryption algorithm being used, and can decide whether or not to enter, and subsequently transmit sensitive information, such as his credit card and address details.

In practice however, users frequently do not check that the link is secure, far less that it is of suitable cryptographic strength to protect the information being transmitted. In order to address this problem, e-mail applications such as Microsoft Corporation's "Outlook" provide the ability to encrypt all e-mails by default.

The wide adoption of usernames and passwords has created a management problem for many Internet users due to the sheer number that need to be remembered, particularly when good security practice requires passwords to be frequently changed. Similarly, users will often need to use a variety of different usernames since someone else may already have taken their 'favourite' at a given site. Facilities to remember, and to automatically complete username and password fields on subsequent occasions, have been provided in web Browsers such as Microsoft Corporation's "Internet Explorer", and by add-on 'helper' utilities such as Gator. com's "Gator". These facilities typically maintain a file of usernames, passwords and the web page to which each applies. These files are encrypted to ensure that only the appropriate user can access them. If such username and password files are lost or become unavailable, such as when the authorised user has forgotten the encryption key or can no longer be contacted to provide it, or when the file is accidentally or maliciously lost, destroyed, or corrupted then access to Internet accounts and services may be lost, and each site must be approached individually to replace or recover the necessary username and/or password. This can be a very expensive problem for corporations in terms of lost access and administrative time. Additionally, such remembered usernames and passwords are only available for use on the machine on which they were originally used. If the user moves to another machine, or uses multiple machines then the stored usernames and passwords are unavailable to him from those other machines.

All businesses, and many individual users, have a legal obligation to maintain accurate records of the transactions they undertake, but for eCommerce transactions this can prove difficult. Businesses must keep records for auditing purposes, for example to prove the terms upon which goods were ordered in the event of a dispute. Such records are considerably more difficult to maintain in an eCommerce environment, requiring the user to retain, for example, copies of orders sent by e-mail, or to print out the web page receipt from a web site purchase. For the user, this is labour intensive and there is no guarantee that any such created records are complete or reliable.

One automated solution of keeping records of eCommerce transactions is provided by Max Manager Corporation's "Max Manager" application. Max Manager captures receipt pages at known web sites, extracts transaction information from those receipt pages, and then stores locally both the receipt page and the extracted transaction information on the machine on which the application is running. However, in order to operate, Max Manager must be supplied with the exact address and layout of the receipt page. Max Manager determines that an eCommerce transaction has taken place either by detecting the address of the receipt page, or by comparing the current page being viewed by a browser with the layout of the receipt page that it has been supplied with. Once it has identified a receipt page, the relevant transactions details are extracted from the receipt page by using the known layout of the page as a template for matching purposes. A significant drawback with Max Manager is that it may only be used to extract data from those pages for which it has been supplied with details. Moreover, if the layout of the receipt page is changed then Max Manager cannot meaningfully extract any data from the page until it is supplied with a new template for the changed layout. Since web sites change frequently, Max Manager must be constantly updated to take account of such changes. This is impractical on a large scale and inevitably leads to transactions being missed, or worse reported incorrectly.

Problems also stem from the fact that computer terminals are distributed, often resulting in terminals and users being located at different locations. In multi-user environments, user machines may be physically connected to each other, for example using a Local Area Network ("LAN"), which provides a gateway for connection to the Internet. They may also be connected to local servers such as Microsoft Corporation's "Exchange Server", which acts as a central collection and distribution point for e-mail messages, and Microsoft Corporation's "Proxy Server", which acts both as a cache to improve performance of frequently visited web Sites, and as a filter to prevent access to certain web Sites which may have been designated as undesirable. However, in so far as the exchange of information is concerned, except in the case of a message sent between two local users, each user operates entirely in isolation from others at the same location. This presents a significant management problem for corporate and other organizations, which have no means of centrally controlling employee activity and cannot benefit from the significant cost savings that might be made from the sharing of information. For example, two users in an organization may independently receive e-mail messages digitally signed by the same sender. Both recipients must separately validate the Digital Certificate, incurring two validation charges, at least one of which was unnecessary.

The present invention provides additional functionality to the systems mentioned above to alleviate their inherent problems and to provide a single integrated system for information exchange.

SUMMARY OF THE INVENTION

The invention is set forth in the independent claims to which reference should now be made. Advantageous features of the invention are set out in the appendant claims.

The information management system provides many advantages in the eCommerce environment to on-line trading companies, who may benefit by being able to regulate the transactions made by their staff according to their instructions encoded in the policy data, automatically maintain records of passwords and business conducted on-line, avoid paying for unnecessary checks on the validity of digital certificates, and ensure that the transmission of data by their staff is always protected at an agreed level of encryption.

BRIEF DESCRIPTION OF THE DRAWINGS

The preferred embodiment of the invention will now be described in more detail, by way of example, and with reference to the drawings in which:

FIG. 10 is an illustration of example policy data for determining whether or not a digital certificate should be verified;

FIG. 12 is a flowchart illustrating the operation of a plug-in module, according to a preferred embodiment of the invention, for identifying transmissions from a user or to a user that comprise part of an eCommerce transaction;

FIG. 13 is an illustration of example policy data intended to be used with the process illustrated in FIG. 12 to identify a transaction;

FIG. 16 is an illustration of example policy data for determining whether an identified transaction requires approval, and for identifying an appropriate approver;

FIG. 17 is a flowchart illustrating the operation of a plug-in module, according to a preferred embodiment of the invention, for determining an appropriate level of encryption for a transmission and allowing that transmission to be transmitted only if that level is provided.

DESCRIPTION OF THE PREFERRED EMBODIMENT

The preferred system provides users of the Internet with an automatic way of managing the flow of information on a computer system. It provides facilities to manage the security level at which transmissions occur, facilities to record on-line transactions and to refer transactions that are about to be made to third parties for approval, and means to stop transactions from occurring if approval is refused; it also provides facilities to extract and record pertinent data from any transmissions that are received or are about to be transmitted.

The preferred system provides solutions for many of the problems encountered by eCommerce companies trading over the Internet; consequently the following exemplary discussion will be directed mostly to the implementation and use of the system by a company of reasonable size conducting at least some of its business over the Internet. It will be appreciated that anyone however, including companies of any size or description and private individuals, who use the Internet may benefit from the functionality provided by the preferred system.

The functionality of the preferred system is implemented through modules of code which are 'plugged-in' to the web browser or e-mail client. These 'plug-in' modules may be used to control and alter the behaviour of the web browser or e-mail client in operation.

Many existing web browsers and e-mail clients may already be readily integrated with such plug-in modules. In the case of Microsoft's Internet Explorer, the plug-in is known as a 'Browser Helper', and is more fully described in the document "Browser Helper Objects: The Browser the Way You Want It" by Dino Esposito, published by Microsoft Corporation in January 1999. In the case of Microsoft's Outlook and Exchange e-mail Clients, the plug-in is known as an 'Extension' and is more fully described in the document "Microsoft Outlook and Exchange Client Extensions" by Sharon Lloyd, published by Microsoft Corporation in March 1998. The use of the 'Browser Helper Object' and 'Extension' plug-ins made in the preferred system will be described in more detail later.

The use of browser or e-mail client plug-in modules to implement the functionality of the preferred system has the additional advantage that, since encryption of message content is usually carried out by the browser or e-mail client itself, examination of transmission content, to extract password information or to determine the desired level of encryption for example, may take place before the content has been encrypted ready for transmission, or indeed after it has been received and unencrypted.

Figure 1:
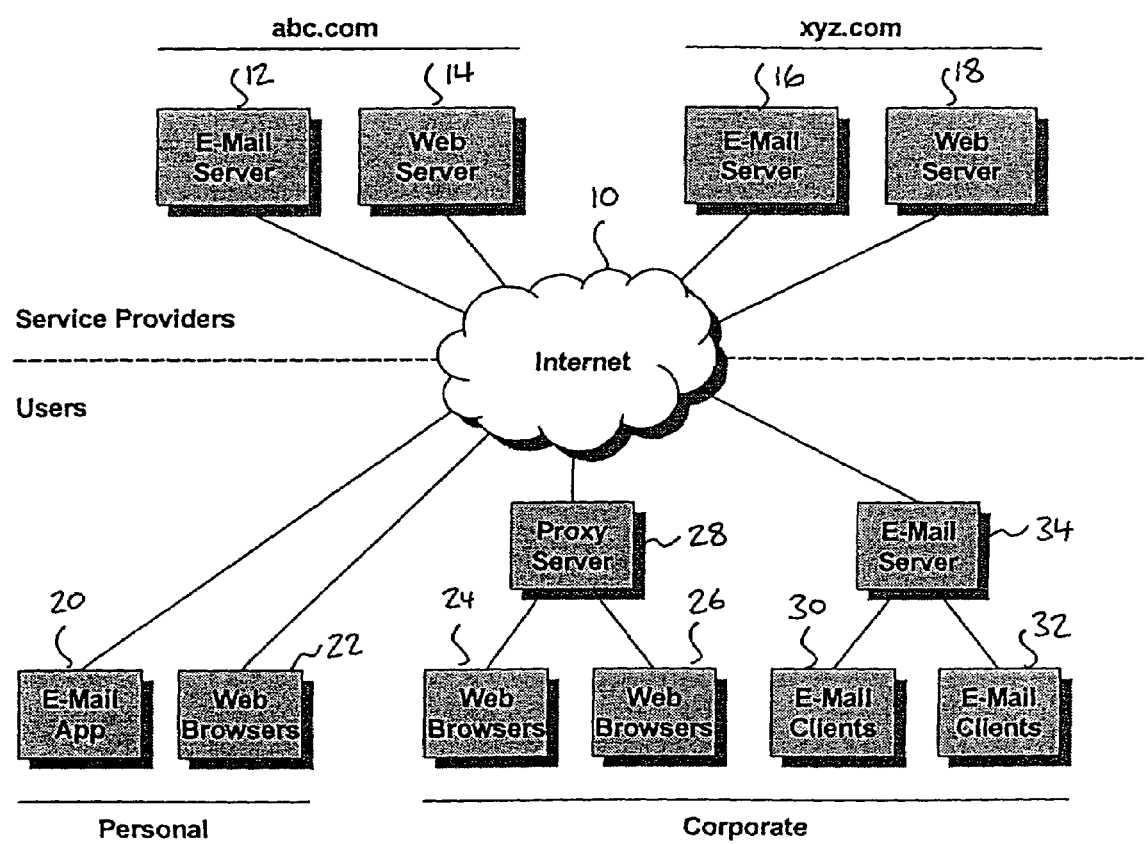
FIG. 1 is a schematic illustration of the present arrangement of systems and resources making up the Internet according to the prior art.

FIG. 1 shows the relationship between service providers, typically companies selling goods and services over the Internet 10, and users wishing to purchase such goods or services. Users equipped with web browsers 22, 24 and 26, can connect via the Internet and retrieve web page information from web servers 14 and 18. Alternately users with e-mail applications 20, 30 and 32, can send and receive e-mail messages with abc.com and xyz.com via e-mail servers 12 and 16.

In a corporate set up, such as that which is illustrated in the bottom right hand corner of FIG. 1, web browsers 24 and 26 of a corporate user are connected to the Internet via proxy server 28. The proxy server 28 is used to cache web pages and control access to web sites. Similarly, the corporation has e-mail clients 30 and 32, connected to the Internet via e-mail server 34 which acts as a central collection point for e-mails coming into the corporation and which controls distribution of the e-mails to individual users. It will be appreciated that while FIG. 1 describes abc.com and xyz.com as sellers, a corporation can be both a buyer and a seller, and as buyers abc.com and xyz.com would be described as corporate users for the purpose of this description.

In the case of e-mails sent and received by personal e-mail application 20, it should be noted that the mail will typically be collected and distributed by a remote e-mail server provided by the supplier of the Internet connection service to which the personal user subscribes.

Figure 2:
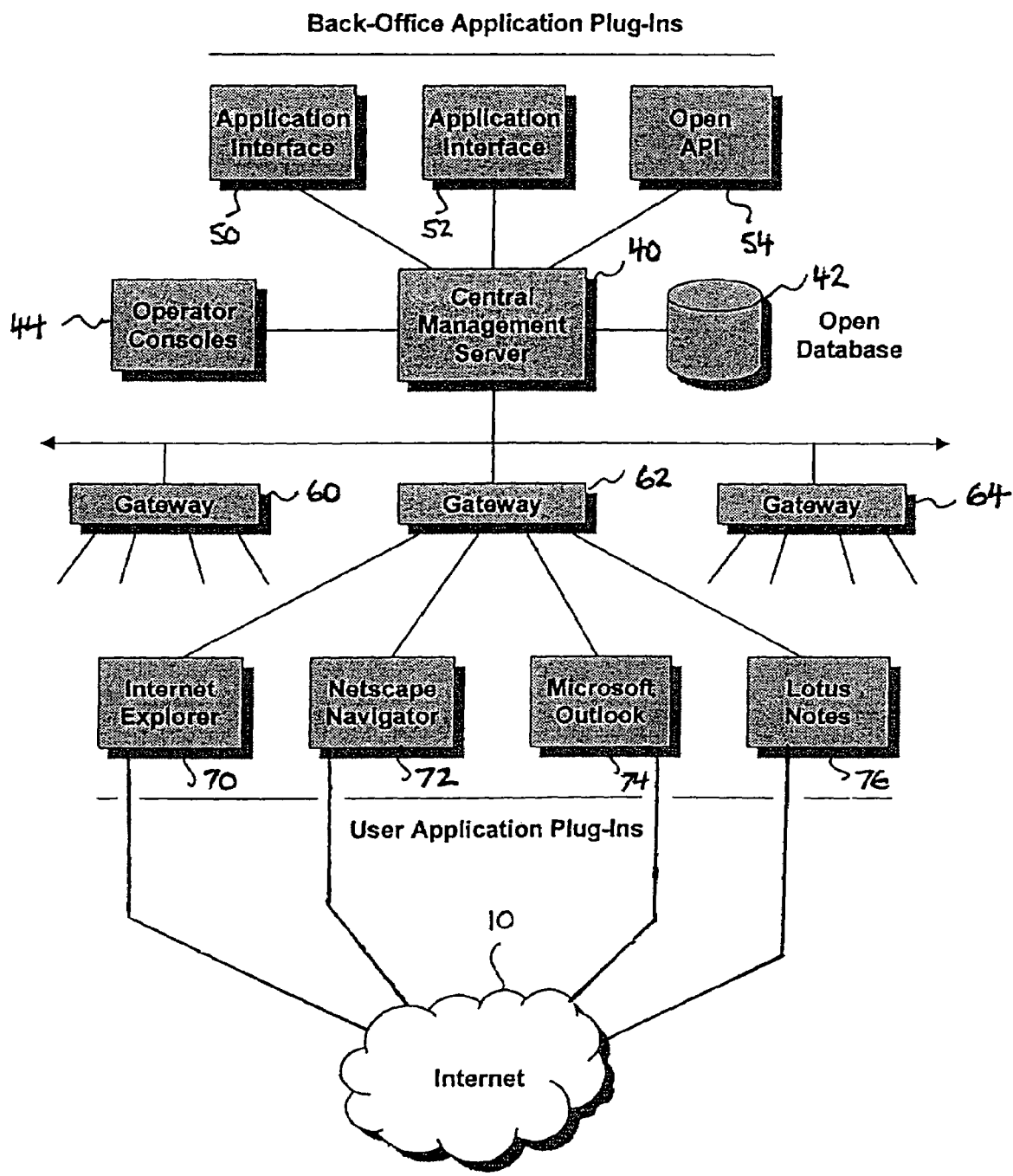
FIG. 2 is schematic illustration of the preferred embodiment of the invention implemented in a corporate environment.

While many of the features and functions of this system provide considerable benefit to an individual user, the system provides the maximum advantage when operating in a multi-user environment where transaction information is gathered from many users. FIG. 2 shows a schematic diagram of the preferred configuration of the system in a multi-user environment. The preferred system comprises a Central Management server 40 connected to a database 42 and operator consoles 44. The Central Management Server 40 is also connected to Back Office Application Plug-ins comprising Application Interfaces 50, 52 and open Application Program Interface 54, and to Gateway components 60, 62 and 64. Gateway component 62 is shown as connected to User Application Plug-ins, located on one or more user's machines, comprising Internet Explorer Plug-in 70, Netscape Navigator Plug-in 72, Microsoft Outlook Plug-in 74, and Lotus Notes Plug-in 76. These plug-ins are used provide the functionality of the preferred system in the hosting program in which they are integrated. Four possible hosting programs are shown, Internet Explorer, Netscape Navigator, Microsoft Outlook and Lotus Notes, but any other program with the capability to connect to the Internet may also be used, providing its behaviour can be modified to implement the functionality of the preferred system.

Connection to the Internet 10 is made via the User application plug-ins and their respective hosting programs.

The gateway components 70, 72 and 74 are optional but are preferred as they enable the entire system to scale, with each gateway storing and forwarding information, thereby allowing any number of users to be connected.

Information from the multiple application Plug-Ins 70, 72, 74 and 76 for the different applications on multiple user machines is gathered by the central management server 40 and stored in an associated database 42.

The Back Office Application Plug-Ins 50, 52 and 54 allow the system to interface with third party management applications such as order processing and accountancy systems. This allows transaction information to be automatically entered and processed by such systems.

Operator Consoles 44 are provided for administrative purposes, and in particular for the approval of transactions. While logically depicted as directly attached to the central management server in FIG. 2, such consoles could be run on any networked machine. Where an e-mail or web browser plug-in determines that a particular transaction requires approval, a request is sent to the Central Management Server and queued pending approval by an authorized operator.

The operation of the system is controlled by policy data, which stores the corporation's regulations regarding security, authorisation, and the actions that user's are permitted to perform, as well as operating information. Preferably, the policy data is stored in a policy file on the central Management Server for access by any of the Operator Consoles 44, Back Office Application Plug-ins or User Application Plug-ins. The system administrator or network supervisor may define one or more policies or settings of the policy file and may assign individual users or groups of users to different policies, thus controlling a user's ability or even a workstation's ability to interact with the Internet without the need to set parameters and controls directly at each user's machine. A user in the accounts department of a company for example may be assigned to an 'accounts policy'; any subsequent change to that policy will then automatically result in a change in the capabilities of all users assigned to that policy.

It is preferred that the capability to edit or set the policy data is restricted to the network supervisor or other authorised person or persons. This may be achieved by designating one or more supervisor workstations in the network enabled with access to edit the policy data such as Operator Consoles 44.

Preferably, the policy is tree-like in structure, allowing settings to be forced down to individual policy nodes of the tree, and global changes to be rapidly made, for example if the CEO wishes to cause all purchases to require his approval if company cash flow should become a problem. Such a policy based system greatly reduces the latency inherent in both traditional purchasing systems and in current eCommerce purchasing environments.

Each user of the network will have his or her own representation of policy data. Preferably, only the branches and leaves of each user's policy that differ from a master network policy are stored as this allows space in memory to be saved. Although the policy data is preferably stored in file form on the Central Management Server, it is not intended that storage of the policy data be restricted to file form only. Any other representation or encoding of policy settings may be employed within the preferred system.

The implementation of the system in a web browser or in an e-mail client will now be described in more detail.

Use of the Preferred System in a Web Browser

Figure 3:
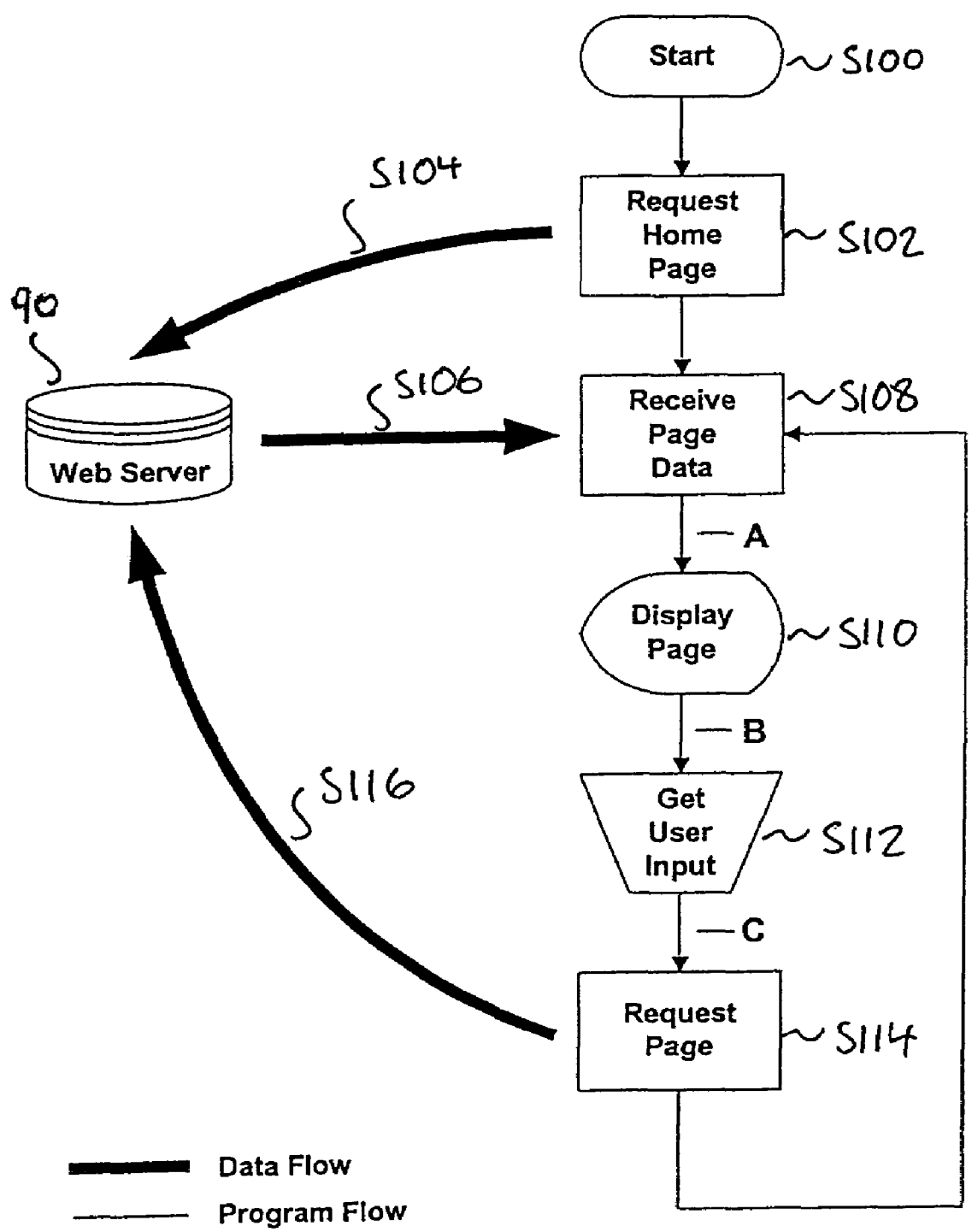
FIG. 3 is a schematic illustration of the operation of a web browser in accordance with the preferred embodiment of the invention.

FIG. 3 shows the simplified operation of a web browser. The web browser is launched at step S100 in response to a start request from either the user or automatically from the start-up file of the user's computer. The start-up file contains commands to automatically run specified programs when the computer is booted-up. After the web browser has been started it typically requests a 'home page', the default web page for viewing, in accordance with a pre-determined setting. This is shown at step S102.

The request is sent to the appropriate web server 90, the exact Internet address of which usually being determined by Domain Name Services; the web server 90 then replies with the appropriate data defining the web page. This process is represented respectively as steps S104 and S106 which result in step S108.

The data defining the web page consists of HTML script, and other possible data types such as XML or ActiveX, and Javascript which encodes executable programs. The Browser interprets this data, displaying and/or executing it as appropriate at step S110.

The browser then typically waits for user input at step S112. Such input may include filling displayed fields, clicking on a hyper-link, or entering the URL address of a new web page. Ultimately, such actions lead to a further request being sent to the web server 90 at step S114 and step S116. The request may simply be another web page address, or it may contain additional data such as that typed in to displayed fields by the user.

Figure 4:
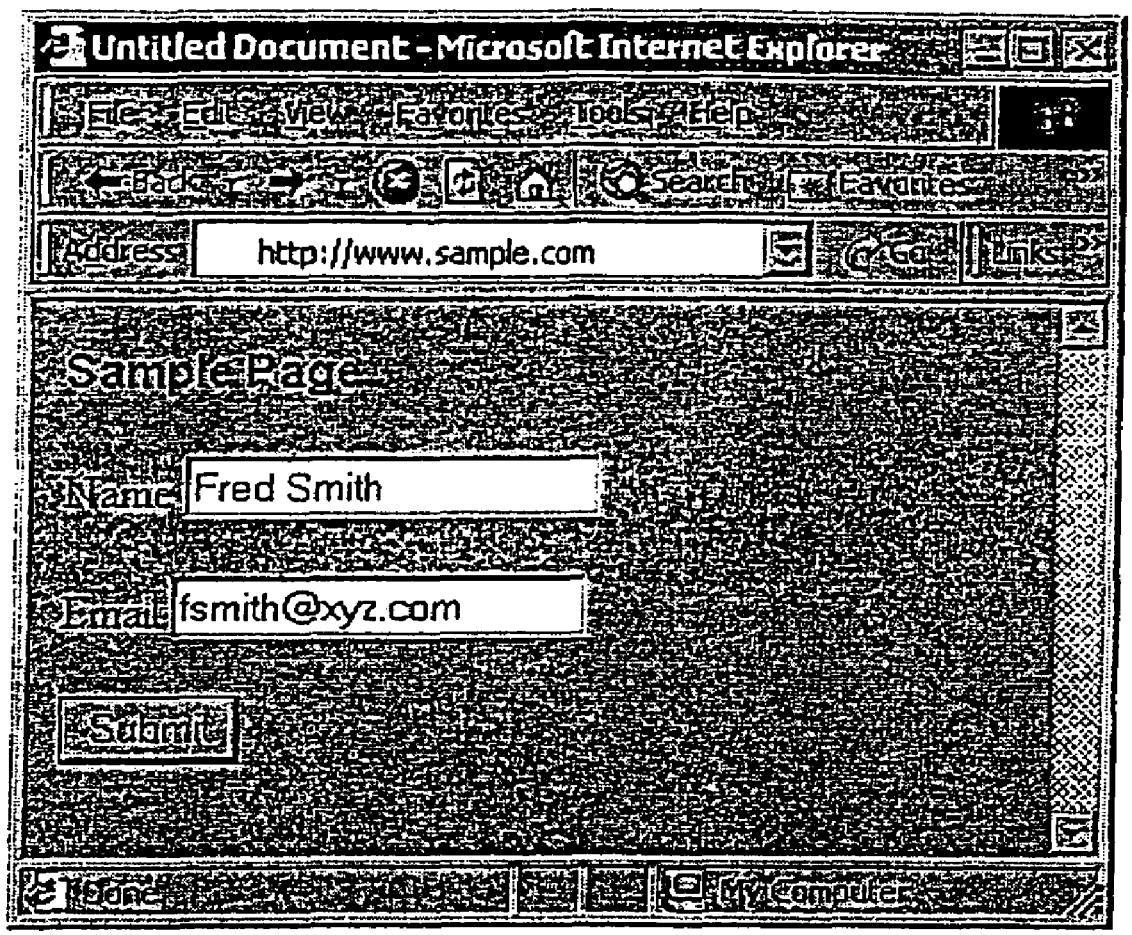
FIG. 4 is an illustration of a typical input window generated by a web browser.

FIG. 4 shows a sample web page display, in which a GUI is presented to the user in order to receive the users name and e-mail address. It will be seen from reference to FIG. 4 that the user has entered his name as 'Fred Smith' into the name request field provided, and his e-mail address as 'fsmith@xyz.com' into the e-mail address field.

When the user clicks the 'Submit' button provided on the request window, the details the user entered are included in the command sent to the web server 90. Such a command might be:

1 http://www.sample.com/
   sample2.htm?UserTD=Fred+Smith&emai
   1=fsmith@xyz.com&submit=submit It can be seen from the above that the user's name is incorporated into the command as the value of a variable called 'UserID' and his e-mail address is incorporated as the value of a variable called 'email'.

The command is assembled in step S114, and transmitted to the web server 90 in step S116 where the user name and e-mail address information may be used, for example, to send product information to the user via e-mail, or to gain access to other web pages.

The plug-in module provided by the preferred embodiment of the invention in the form of a Browser Helper Object (BHO) provides additional functionality to augment that of the standard web browser. The BHO is implemented to respond to a number of significant events that occur as the web browser is operated and directed by the user to interact with various web sites and pages.

The BHO is implemented to monitor navigation requests and data submitted to the web server from the browser and identify data that is unique to the user. It may do this simply by searching the outbound data stream for the presence of pre-determined words or phrases. In the above case shown in FIG. 4, the two variable definitions 'UserID' and 'email' may be searched for, and the data that follows them extracted and stored. Alternatively, the BHO may search for the '?' symbol, which indicates the end of the URL address being connected to and indicates that what follows is data. The BHO may also monitor the inbound data stream received from the web site being connected to.

Also, the BHO may be implemented to monitor the operation of the web browser itself. As the web browser operates it generates 'events' to notify co-dependent software modules or objects that something significant has just occurred or that an action has just been completed. The name of the event is usually descriptive in its own right of what has just occurred; additional data that describes the event in more detail is normally available. The BHO is implemented to trap these events and to take action in dependence on them.

One such event that the BHO is implemented to respond to is called 'BeforeNavigate' which the web browser fires when the user requests the browser navigates to a new page. The event is issued and may be recognised by the BHO before the requested page is downloaded, allowing the BHO to take any pertinent action before the user views the page. One such action might be to record the page and any data submitted in response to that page in a database. Another such action might be to identify the URL of the requested page from the event and prevent the page being downloaded.

Another event that the BHO traps is the 'DocumentComplete' event, which is fired by the web browser when a new page has been fully downloaded from the web site into memory. The page is encoded in the form of a Document Object, conforming to Microsoft's Document Object Model (DOM). The DOM provides comprehensive access to the data comprising the page, allowing the BHO to extract data items which are of interest to it. For example, the BHO may request data from the DOM to determine whether the page forms part of an eCommerce transaction. It may do this by searching objects in the DOM for terms such as 'Receipt' or 'Account Number'.

The BHO may also use the DOM to determine the field names or field types of data being requested on a web page. The data entered by the user into such fields may then be extracted from the DOM and stored or acted upon. Field names are typically descriptive of what is stored; passwords, for example, are often held in a field called 'password' and so may be searched for on a web page. Credit card numbers may be searched for in a similar way. Usually, password fields are of a type such that any entered data is displayed as asterisks. This too may be determined from analysis of the DOM and used to identify pertinent data.

User data would not normally be present in a web page downloaded from a web site, but would be entered by the user into an HTML form. Usually, the potentially sensitive user data is transmitted to the web site via the web server when the user selects a 'Submit' button. At this stage, the BHO can trap the 'Submit' event issued by the web browser, and access the DOM to extract the user data, and, if necessary, prevent the data from being transmitted.

Encryption and decryption on a secure link will take place after point C and before point A in FIG. 3 respectively. Thus, the BHO may analyse the data before it is encrypted or after it is decrypted. This is advantageous since there is no need for the BHO to perform any encoding or decoding of data itself. This does not affect the ability to determine if the link is secure or not, since a secure link can be identified by the protocol identifier "https" at the beginning of the current URL. It is preferred that examination of the transmission's content take place before encryption or after decryption occurs.

Discussion of the Operation of an E-mail Client

Figure 5:
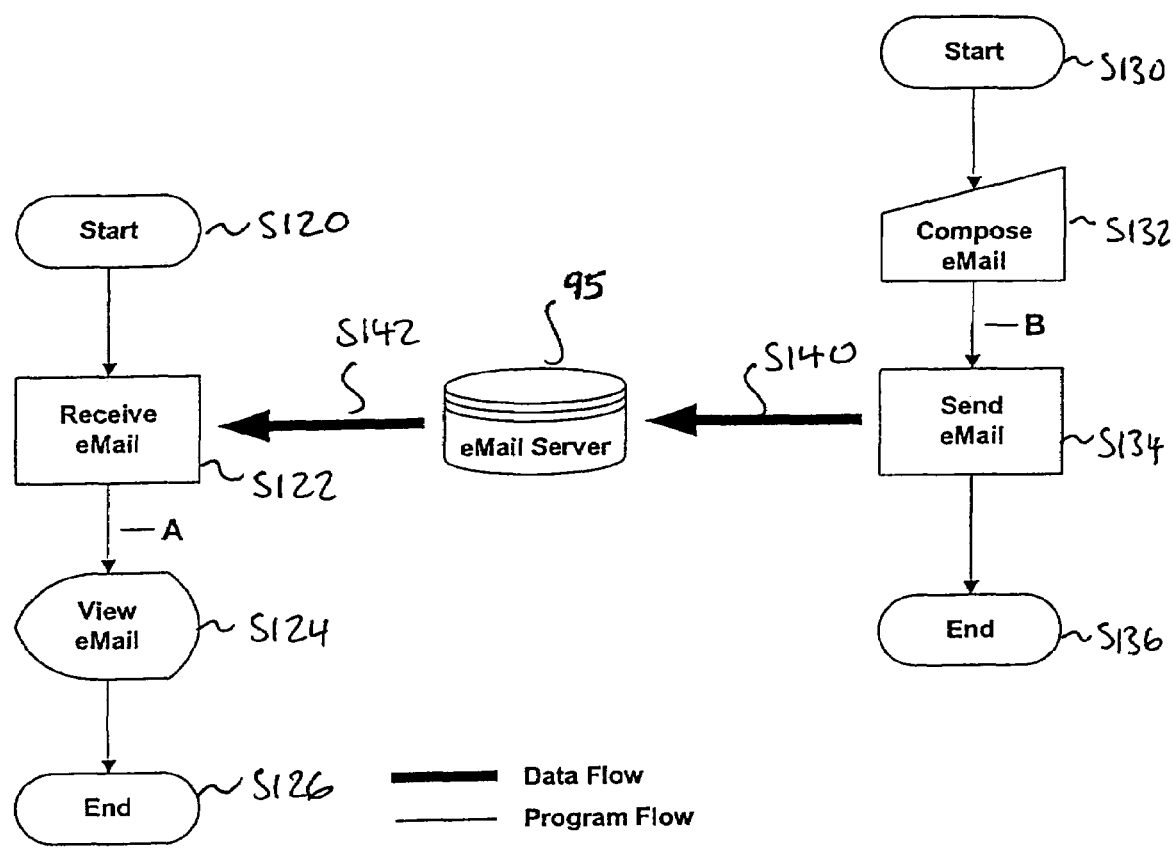
FIG. 5 is a schematic illustration of the operation of an e-mail client in accordance with the preferred embodiment of the invention.

With reference to FIG. 5 of the drawings, the operation of a typical e-mail client, and the implementation of the preferred embodiment in an e-mail client will now be described.

FIG. 5 shows the simplified operation of an e-mail client. Receive and Send operations typically operate independently, and these operations are shown separately on opposite sides of FIG. 5, beginning at steps S120 and steps S130 respectively.

An e-mail client's 'receive message' operation is initiated at step S120. This may be done automatically at predetermined intervals in order to keep the user informed of any new messages that he has received, or it may be done in response to the user manually selecting a 'receive messages' icon. Starting this operation causes the e-mail client to poll the e-mail server 95 and download any new messages to the user's machine. In step S122, an e-mail message is received by the e-mail client. Typically, when a new message is received, it is added to an 'Inbox', with the received message headers (senders name, date and title for example) arranged in a list. The user then clicks on the appropriate entry in the list to read the full message causing it to be displayed on his computer screen. The e-mail message is displayed at step S124.

In the case of an outgoing e-mail, the user selects a 'compose e-mail' option as step S130. In response, the e-mail client provides an interface comprising a text editor in which the user can enter the text of the body of the message and other information such as destination address, subject and so on. The user composes the message in step S132 and then opts to send it, by selecting an icon or menu option provided by the e-mail client to issue a 'send command'. The e-mail is sent to the e-mail server for transmission to the recipient in step S134. If any encryption is applied by the e-mail client it is applied in step S134 before transmission.

In the preferred embodiment, additional functionality is provided for the e-mail client via a plug-in module. Preferably, the e-mail client is one of those provided by Microsoft, such as the Microsoft Exchange client, or the Microsoft Outlook client, and the plug-in module is encoded as an Exchange client extension. These are described in the document "Microsoft Outlook and Exchange Client Extensions" by Sharon Lloyd mentioned earlier.

An Exchange Client Extension is a component object that complies with the Microsoft Windows Component Object Model (COM) and that utilizes the Exchange IExchExt interface. This interface provides a number of additional interfaces for modifying the operation of the Exchange e-mail client, such as the IExchExtCommands interface, which allows existing client behaviour to be replaced or modified and new commands to be added to the client's menus; and the IExchExtEvents interface which allows custom behaviour to be implemented to handle client 'events' such as the arrival of new messages, reading, writing, sending messages and reading and writing attached files. The IExchExtMessageEvents, IExchExtSessionEvents and the IExchExtAttachmentEvents interfaces are also provided and provide additional functionality for the more specific tasks that each of the interfaces names suggest.

In the preferred embodiment, the Exchange Client Extension that forms the plug-in module is implemented to respond to client 'events' that are fired by the client program as it performs operations and completes actions. The 'events' in question are provided by the COM interfaces mentioned above. The monitoring of the e-mail client by the plug-in module may therefore be seen to be analogous to the way in which the BHO plug-in module monitors the operation of the web browser.

The e-mail client plug-in module is implemented to respond to the 'OnDelivery' event for example which is fired when a new message is received from the underlying mail delivery system and before it is visible to the user. The 'OnDelivery' event contains information to access the different parts of the e-mail message that have been downloaded and which are held in memory. The message header, the message body and any message attachments are encoded in memory as properties of the message object which may be separately accessed through Mail Application Program Interface (MAPI) calls.

Via the information supplied as part of the 'OnDelivery' event, the plug-in module may access the message header and extract the identity of the sender for example. Furthermore, the plug-in module may utilise information obtained from MAPI calls to scan the body of a received message for keywords or pertinent data. It may search for evidence of an eCommerce transaction, by identifying significant words such as 'receipt' or 'account number'. The message may then be stored for auditing purposes. In the case of an unapproved sender, or harmful message content, the message may be deleted unseen.

The analysis of a received e-mail occurs therefore at point A in FIG. 5 prior to being viewed by the user. Preferably the e-mail is examined before the e-mail is even placed in the Inbox. Where a message is not automatically decrypted before being placed in the Inbox, for example where the user is required to enter a decryption key, the message is examined immediately following decryption, but before viewing. Digital Certificates may be included as attachments to the e-mail and can readily be examined prior to viewing, allowing any appropriate actions, such as validation, to be performed.

Another significant client event that the plug-in module is implemented to respond to is the 'OnWriteComplete' event which is fired when the user has selected the 'send command' and requested the e-mail client to transmit a new e-mail message to the mail delivery system. This event is fired, at point B in FIG. 5, before the transmission and before any encryption takes place. The new message which is to be transmitted is similarly stored in memory as an object which may be accessed by MAPI calls. The plug-in module may use the MAPI calls to scan the content of the outgoing e-mail for sensitive data, such as credit card number, and consequently cause the message to be recorded or even blocked.

Plug-In Module Operation

The preferred implementation of the web browser and e-mail client plug-in modules has been described above with reference to FIGS. 3 and 5 above. Next, the functionality provided by the plug-in modules will be described in detail and with reference to FIGS. 6 to 18.

Identifying and Recording Usernames, Passwords and Other Information

The preferred system provides means to automatically identify, collect and store data contained in transmissions to and from a user's workstation, in particular, the usernames and passwords entered by a user to access web site pages, File Transfer Protocol ('FTP') sites and other such sites on the Internet.

Systems that presently provide facilities to record passwords currently only do so when a user a clicks on the 'remember password', option provided on the GUI. The password is saved into a protected local file on the user's machine that is only opened when the user is authenticated on that machine, for example, by entering his username and password at boot time. The remember password option causes the system to remember the user's password when he next visits, pre-filling in the password field with that password so that the user does not have to enter it each time it is required. The drawback of the password file being stored locally is that if the user moves to another machine he does not have access to the stored password file and will have to re-enter the password himself.

The preferred system identifies passwords automatically, without the need for instruction from the user, and stores the identified passwords and usernames in a data repository. Preferably this is central database 42. This allows the passwords of any user to be recalled regardless of the terminal at which the user logs on, providing the terminal has access to the central database.

Any identified passwords and usernames are stored in the database along with the field names in which they are stored on the original web site and the address of the Internet site to which they were transmitted to and at which they are used. Site information can be retrieved straightforwardly as it is included in the HTTP request submitting the password and username information to that site, and in the representation of the web page held in memory.

Preferably, for the sake of security, the information stored in the database is encrypted, so that only a select number of people, such as network supervisors, system administrators or company directors have access to it. They may access the database either through a workstation in the network, by entering a username or a password to identify themselves, or through a supervisor workstation, such as Operate Consoles 44.

This storage of usernames and passwords along with address details presents a significant advantage to companies that use on-line facilities. With existing technologies, if a user forgets his authenticating password preventing access to the protected file, or leaves the company without having disclosed it, the Internet service cannot be accessed. A similar situation occurs if the protected file is damaged, deleted or otherwise lost. Each Internet service must then be approached in order to replace or recover the lost password, which can be expensive both in terms of lost access and administrative time. With the preferred system, the password information may be recovered from the central database, so that access to web sites is not lost.

Figure 6:
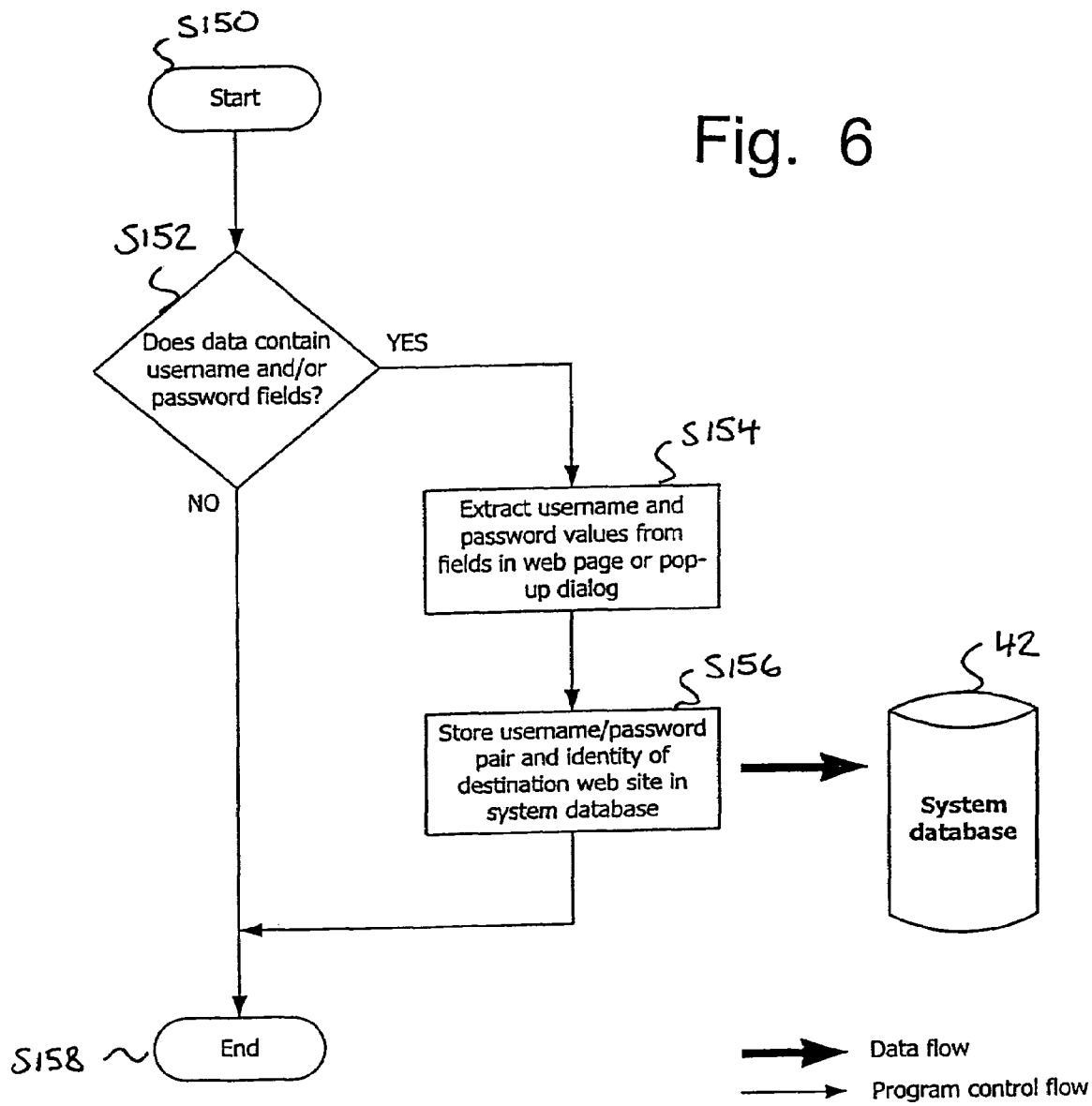
FIG. 6 is a flowchart illustrating the operation of a plug-in module, according to a preferred embodiment of the invention, for capturing username and password values transmitted by a user to a remote web site.

FIG. 6 is a flow diagram which schematically illustrates the operation of a plug-in module implemented to extract user name and password information from data to be transmitted to a web server.

In step S150, the plug-in module begins and parses the data about to be transmitted to the web server from the browser. This occurs at point 'C' in the process illustrated in FIG. 3. Control then passes to step S152 where the plug-in module determines whether or not the data which is to be transmitted contains username or password information.

The passwords and usernames may be identified in the manner described above with reference to FIGS. 3, 4 and 5, by identifying field names in submitted command or by using the DOM, for example, to search for field names, field types, or the display method used to identify the data on web pages. They may also be retrieved from the HTML of web pages, the pop-up windows or GUIs (Graphical User Interfaces) presented by remote servers or providers on the World Wide Web or even by scanning the content of e-mail messages.

Identifying passwords and usernames in transmitted commands or in the DOM of a web page from their field names relies on those field names describing their purpose with obvious labels such as 'password' or 'username'. In cases when the field names are not themselves meaningful, the nature of data being transmitted, may be inferred from the field type of the data, that is 'String', 'Integer' and so on, or the display method used to enter the data. Fields that are intended to receive a password can be identified from the representation in by searching for a 'password' field type in the DOM. Text boxes on a web page into which password data is to be entered, for example, typically display each character input as an asterisk; this property may be determined from the DOM and used to infer that data input into the text box is a password even if there are no other indications. Although, the password is displayed as a string of asterisks, the representation in memory still contains the character information that was entered by the user. The password may then be retrieved simply by extracting the input from the field.

Alternatively, passwords and usernames may be identified by referring to those stored by other programs such as Microsoft's 'Internet Explorer' when the remember password option is selected by the user. Such passwords are stored in a local protected file on the user's computer. This file is 'unlocked' when the user is authenticated on the computer, and so may be accessed to obtain password and username information by the browser plug-in module of the preferred system.

If the plug-in module does not detect a username or a password in the data which is to be transmitted, control passes to step S158 at which point the module exits and control is passed back to point 'C' in FIG. 3. The browser may then transmit the data to the web server. If however, a username or a password is detected by the plug-in module at step S152 then control passes to step S154, where the values of the identified username or password and the URL or other identifier of the web page to which the data is to be transmitted are extracted. Control then passes to step S156 where, these values and the URL or other identifier are stored in a predetermined system database 42. Once storage has taken place, control then passes to step S158, where the module exits and control is passed back to point 'C' in FIG. 3. The browser may then transmit the data to the web server.

The preferred embodiment need not be limited only to the storage of passwords or usernames which have been used as an example because of the immediate advantage that their storage provides. Other types of data, in particular those relating to eCommerce transactions, such as credit card information and digital certificate may also be usefully extracted and stored to provide a database or record. The system for extracting information from transmissions may also be applied to e-mail systems.

The information may be extracted in the manner described above, via the DOM or via MAPI calls to the COM representation of e-mail content, or may be extracted from the language in which a web page is encoded. Web pages are typically encoded in Hyper-Text Mark-Up Language (HTML), a human readable text based language which may be searched for known key words or indicators using conventional text matching techniques. In the preferred embodiment, recording of the data may involve recording just password and username information, recording the URL of a web page being viewed or of an e-mail account, recording any data submitted to the fields of a web page, and recording the HTML of a web page, so that the web page may be retrieved later and viewed.

The plug-in modules provided by the preferred system operate in conjunction with policy data, which may be recorded in a file, database, or software code for example. The policy data provides a user of the preferred system to instruct the operation of each of the plug-in modules thereby controlling their functionality.

Figure 7:
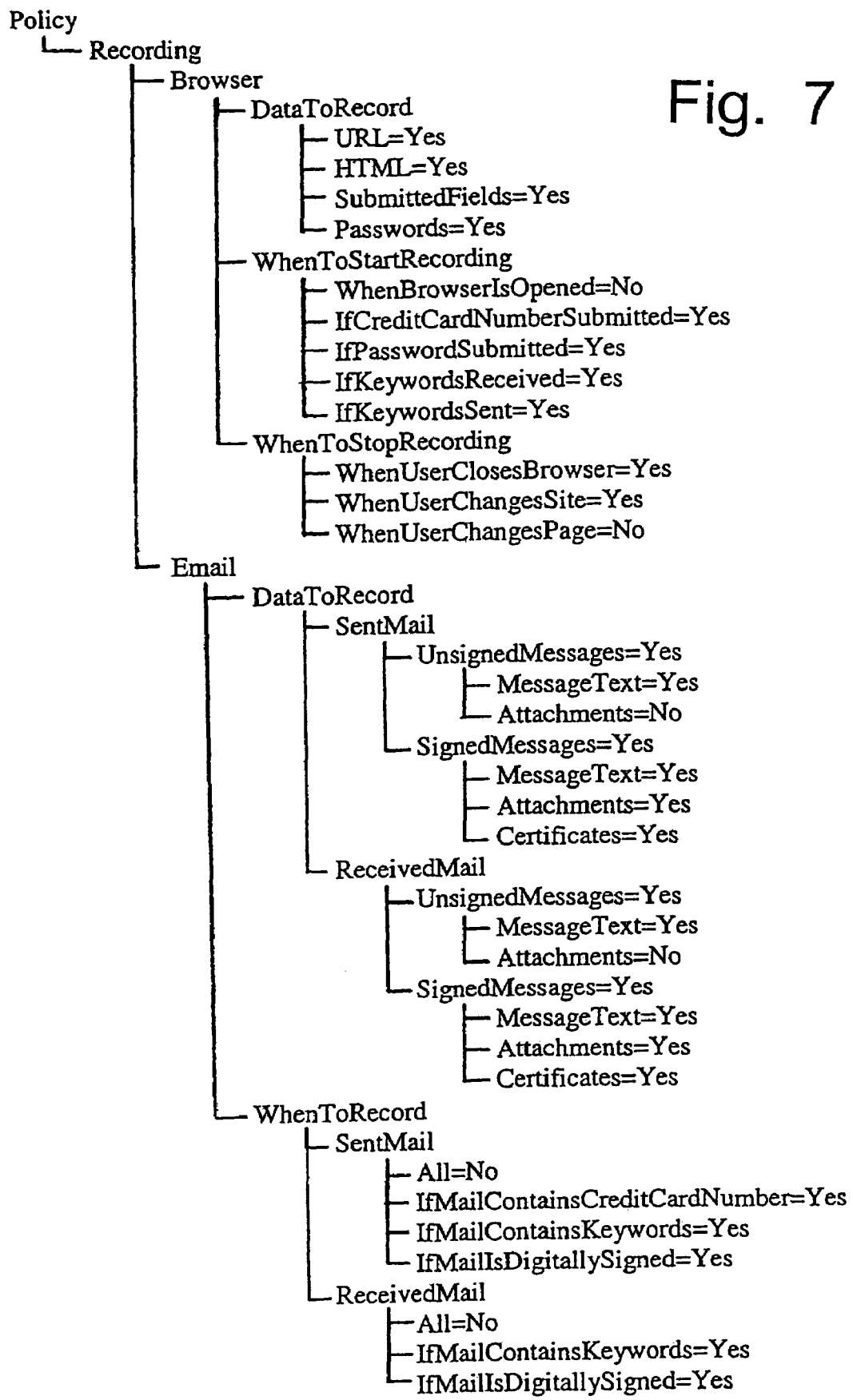
FIG. 7 is an illustration of example policy data specifying control conditions for recording data.

A sample representation of policy data, illustrated in FIG. 7, shows how a user may control the operation of the plug-in module to record password and username information along with other types of data.

The tree-like structure of the policy data is clearly seen in FIG. 7 which shows just one major branch of the policy data entitled "Recording". The Recording branch is separated into two sub-branches called "Browser" and "Email" which contain instructions for the operation of web browser and e-mail client plug-in modules respectively.

The browser branch contains three sub-branches called "DataToRecord", "WhenToStartRecording" and "WhenToStopRecording". The DataToRecord branch specifies the type of data that is to be extracted from transmissions to or from the user's workstation and a web server. Four types of data are referred to in the illustration, these being the URL of the web page being viewed, the HTML of the web page being viewed, data that is entered by a user into fields provided on the web page and submitted to a web site, and any passwords and usernames that are entered by the user. These are referred to on four distinct sub-branches of the DataToRecord branch, entitled "URL", "HTML", "SubmittedFields" and "Passwords". A Yes/No option on each of those sub-branches specifies whether or not the indicated data is to be recorded.

The WhenToStartRecording branch sets out a number of conditions which specify the point at which the data specified in the DataToRecord branch is to be recorded. Five conditions are illustrated in this example each one set out on a separate branch and respectively entitled "WhenBrowserIsOpened", "IfCreditCardNumberSubmitted", "IfPasswordSubmitted", "IfKeywordsReceived" and "IfKeywordsSent". Whether or not these conditions are to be used in order to determine when to start recording is indicated by Yes/No markers on each branch.

Similarly, the WhenToStopRecording branch lists three conditions that may be used to determine the point at which the recording of the data specified in the DataToRecord branch is to be stopped. These conditions are "WhenUserClosesBrowser", "WhenUserChangesSite" and "WhenUserChangesPage". The Yes/No status of each of the conditions and for each of the type of data to be recorded may be easily set by a user of the preferred system in order to control the operation of the plug-in module.

The e-mail branch of the policy data is divided into a DataToRecord branch and a WhenToRecord branch. Each of these branches are sub-divided into branches that deal with Sent Mail and Received Mail. The type of data that may be recorded is set out in the DataToRecord branch and for sent mail may be the message text, any attachments to the message, and in the case of messages signed with a digital signature, a copy of the digital certificate accompanying the signature. Conditions for recording sent mail and received mail are set out in the WhenToRecord branch and may be based on the identification of a credit card number, a keyword or a digital certificate in the mail that is sent or received.

The tree-like structure described is the preferred form for the policy data since it allows the data to be easily organised and referred to. It also allows different users to be assigned to different branches of the tree in order to receive different policies. Although, the tree like structure is preferred, other arrangements may also be possible. The branches shown in this diagram are only intended to be illustrative.

Identification of Credit Card Numbers

The preferred system also searches for Credit Card numbers or other account information in the data to be transmitted to the web server or e-mail client by searching for a string of numeric digits, typically between 14 and 16 long. It then determines if the string of digits passes one of the tests universally used by credit card companies to validate card numbers. If a credit card number is found in the transmission, then the preferred system may take a number of actions depending on the settings in the policy file, such as refer the transmission to a third party for approval, renegotiate a higher level of encryption to safe-guard the transmission if the credit card number belongs to the company, or prevent the transmission from taking place altogether.

The most common test to identify a credit card number is defined in ANSI standard X4.13, and is commonly known as LUHN or Mod 10.

The Luhn formula is applied to credit card numbers in order to generate a check digit, and thus may also be used to validate credit cards, in which case the check digit is figured in as part of the formula. To validate a credit card number using the Luhn formula, the value of every second digit after the first, starting from the right hand side of the number and moving leftwards, is multiplied by two; all of the digits, both those that have been multiplied by two and those that have not are then added together; any digit values that have become greater than or equal to ten as a result of being doubled, are summed as if they were two single digit values, eg: '10' counts as '1+0=1', '18' counts as '1+8=9'. If the total of the sum is divisible by ten, then the credit card is a valid credit card number.

Figure 8:
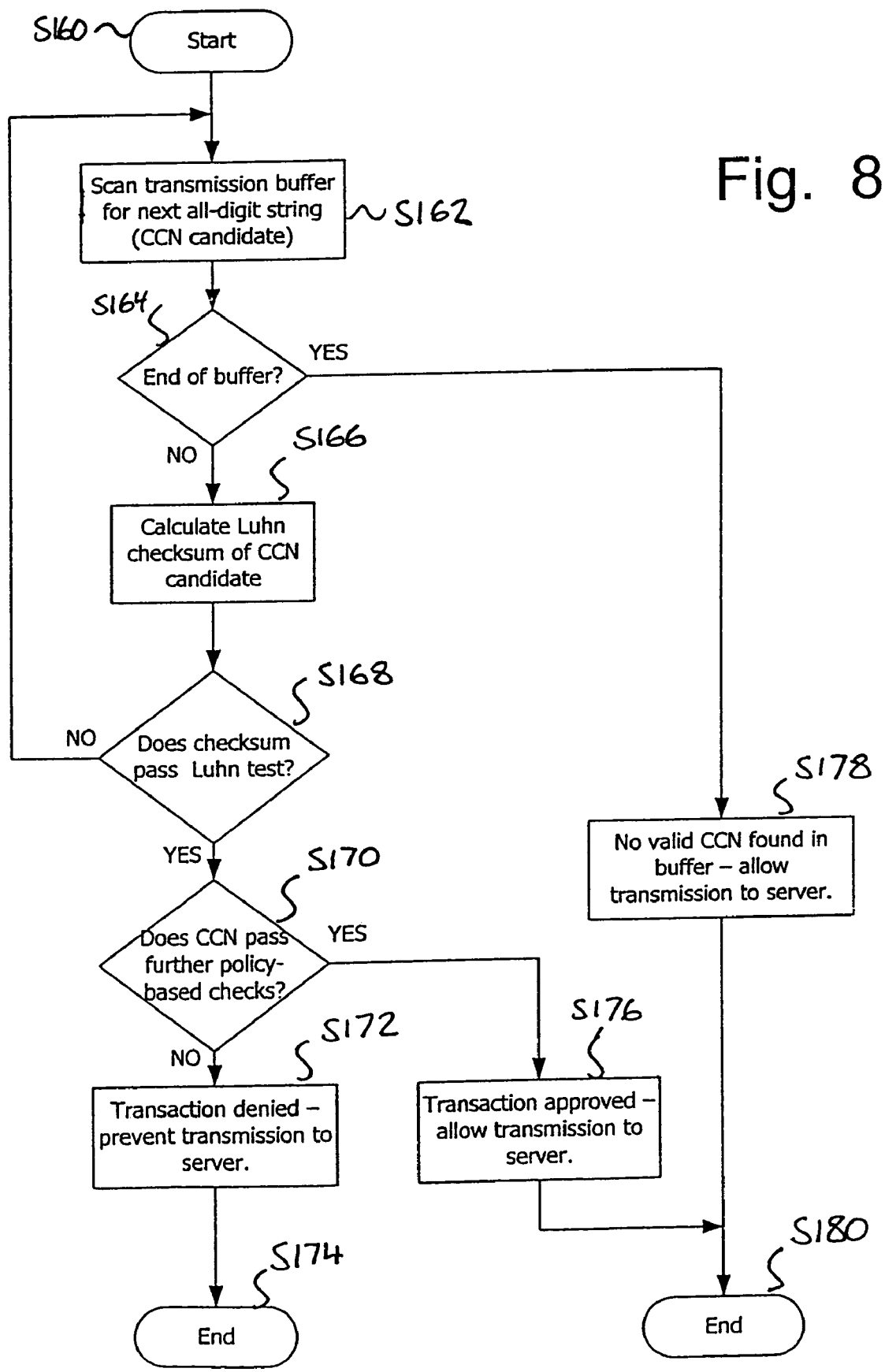
FIG. 8 is a flowchart illustrating the operation of a plug-in module, according to a preferred embodiment of the invention, for recognizing credit card numbers contained in data transmitted to or from a web server or e-mail client.

FIG. 8 is a flow diagram which illustrates the operation of a plug-in module which detects credit card numbers, using the Luhn formula described above, in data which is about to be transmitted. If a credit card number is identified, the plug-in module implements further policy-based checks, based on the outcome of which, the plug-in module may determine to transmit the data containing the credit card number or to prevent transmission.

The module begins operation at step S160, which follows point 'C' in the process illustrated in FIG. 3 in the case of browser implementation, or point B in the process illustrated in FIG. 5 in the case of an e-mail client implementation. Control passes from step S160 to step S162 in which the module scans the data about to be transmitted to the web server or e-mail service and extracts from it a first string of digits that is likely to be a credit card number.

This is achieved by scanning the data comprising the transmission for strings of digits over a particular number of digits long. Credit card numbers are usually made up of more than 12 digits, and are not usually more than 16 digits long. Thus any strings of digits in this range may be identified as possible credit card numbers.

Following the extraction step S162 control passes to decision step S164 where a routine end of file check is made. If the data contains no candidate credit card number and the end of the file check is reached before any first candidate number could be found, then at step S164 control passes to step S178 where the transmission of the data is allowed to proceed without any further checks being made. The module then exits at step S180. Control resumes in the web browser operation shown in FIG. 3 from point 'C' or in the e-mail client operation shown in FIG. 5 from point B.

If a first potential credit card number is found in the data in step S162, then it is extracted and stored in memory. The end of file has not been reached yet so control passes from step S162 to step S164 and then to S166 where a checksum for the stored candidate number is calculated using the Luhn formula. Control then passes to decision step S168, where the checksum is queried.

If the checksum indicates that the candidate number is not a valid credit card number then control passes back to step S162 where the next potential credit card number is extracted from the data. If a second credit card number is not found, then the end of the file is reached and control passes to step S178 where the transmission is allowed to proceed, and then to step S180 where the module exits.

However, if the checksum indicates that the candidate number is a valid credit card number then control passes to decision step S170 where the settings of the policy data are queried for the appropriate action to take. The action may be determined from such factors such as the number itself, the identity of the user transmitting the number and the address to which it is to be sent. The policy data might for example specify that credit cards are not to be transmitted, or that a higher encryption strength is required for the transmission before it may proceed.

This policy checking step allows credit card transactions to be controlled at a higher level than the user making the transaction. Thus financial decisions may be swiftly and easily implemented, and may be enforced automatically without the need for monitoring. An organisation may, for example, wish to restrict the capability to make credit card transactions on the organisation's account to particular authorised people or it may wish to restrict transactions on a particular account altogether.

In step S170, the credit card number, and other details of the transaction are compared to the settings in the policy file and it is determined whether or not transmission may take place. If for any reason, with reference to the policy checks, it is determined that the credit card number should not be transmitted, control passes to step S172 where transmission of the data is halted, and then to step S174 where the module exits. At this point the system could notify the user that the request has been denied by means of a pop-up message box. Control then returns to point A in FIG. 3, in the case of a web browser, or to step S132, 'compose mail' in FIG. 5, in the case of an e-mail client.

If in step S172, it is determined that the credit card number may be transmitted, control passes to step S176 where transmission of the data occurs, and then to step S180 where the module exits. In this case control is resumed from point C in the web browser operation illustrated in FIG. 3, or from point B in the e-mail client operation illustrated in FIG. 5.

Credit card numbers need not be identified in step S162 solely by scanning the content of the transmission. In web browser implementations the credit card number may for example be directly identified by referring to the field names of any variables that are to be transmitted or also from the representation of the web page in memory. The discussion above about the identification of passwords explains this in more detail.

The preferred system may also be configured to search outgoing transmissions for other pertinent financial details, such as account numbers. Company account numbers from which funds may be deposited may be stored in a separate file. Any likely strings of characters or digits may then be extracted from the outgoing data in the manner described and compared with the entries in the accounts file to determine whether or not it is a valid account number. The transaction may then be allowed to proceed or be refused in the manner described above. Although credit card numbers have been referred to, it will be appreciated that any type of card number for making payment such as debit card numbers may also be used.

Also, although identification of credit card numbers has been explained with reference to data that is to be transmitted, it will be appreciated that similar techniques could be used to identify and extract credit card numbers from transmissions that are being received.

Validation and Authentication Support

On-line transactions typically require some form of authentication that the user is who he says he is, and that he is able to pay for the goods ordered. These requirements are usually met by the purchaser supplying the trader with his credit card number and the cardholder address which can then be verified by the seller with the card issuer. Increasingly however, Digital Certificates are attached to electronic transmissions by the user which, in conjunction with a digital signature, allow the receiver to verify that the transmission originated from the person named as sender. Digital certificates from certain issuing authorities, such as Identrus, may also act as a warranty that the holder will honour his commitment to pay a specified amount of money. These certificates are useful when trading on-line.

Digital signatures are a widely used means of establishing an individual's identity on-line when transmitting information or when conducting a transaction. They also provide a guarantee to a recipient of any transmitted information or transaction details that those details and that information have not been tampered with en-route by an unauthorised third party.

Digital certificates are issued to individuals, organisations, or companies by independent Certificate Authorities, such as Verisign Inc. An organisation may also act as its own Certificate Authority issuing its own digital certificates which may or may not be derived from a 'root' certificate issued by another Certificate Authority. A digital certificate typically contains the holder's name, a serial number, an expiration date, a copy of the certificate holder's public key and the digital signature of the certificate issuing authority. A private key is also issued to the certificate holder who should not disclose it to anyone else.

Certificates are unique to each holder and may be revoked by an issuer if the holder is no longer viable; alternatively, a holder may ask to have it revoked if his private key has been compromised.

The public and private keys may both be used in tandem to encrypt or decrypt a message. Anyone may use a certificate holder's public key to encrypt a message so that it may only be read by the certificate holder after decrypting the message with his private key.

Messages may also be digitally signed using software which converts the contents of the message into a mathematical summary, called a hash. The hash is then encrypted using the sender's private key. The encrypted hash may then be used as a digital signature for the message that is being transmitted. The original message, the digital signature and the transmitter's digital certificate are all sent to a recipient who, in order to confirm that the message he has received is complete and unaltered from its original form, may then produce a hash for the received message. If, the received hash, having been decrypted with the holder's public key, matches the hash produced by the recipient, then the recipient may trust that the message has been sent by the person to whom the certificate was issued, and that the message has not been altered en route from its original form. Digital certificates are therefore of considerable and increasing importance to companies conducting business on the Internet.

In cases where an on-line trader makes use of Digital Certificates to ensure the identity of its customers, it is necessary to check with the issuer that the certificate is still valid before any transaction is authorised. Such checks can be carried out on-line using an independent verification service such as that provided by Valicert, Inc. A fee is usually charged for such services.

It may be that individual employees of an organisation each receive e-mails from a single client, each signed with his digital certificate, on separate occasions. Presently, there is no way for a information about certificates received by one employee to be shared with another employee unless they share it themselves manually, and as a result, individual employees might request that the same certificate be validated each time that they receive it. This is wasteful however, since once a certificate is revoked by its issuer, it is never again reinstated, so any validation fees spent on an already revoked certificate are unnecessary. Additionally, the recipient may wish to make a business judgement as to whether a previously validated certificate should be re-checked or not. For example, if a digitally signed order for $1 M worth of goods is received one day, and the certificate successfully validated, and on the next day another order for $50 is received, signed with the same certificate, the organisation may consider a second validation check to be unnecessary, thereby saving the validation charge.

The preferred system provides means to record information about the Digital Certificates that have been received, the status of the certificate at the last check as well as, where applicable, transaction information, such as client, amount, date, goods and so on. This information is stored in a central database to which all users of the system have access. The preferred system also provides means to use the stored information to decide whether or not a validation check is desirable, and to accept or refuse transmissions depending on the status of the digital certificate. Thus, users of the system may receive and review transmissions without the need to establish their authenticity themselves.

Figure 9:
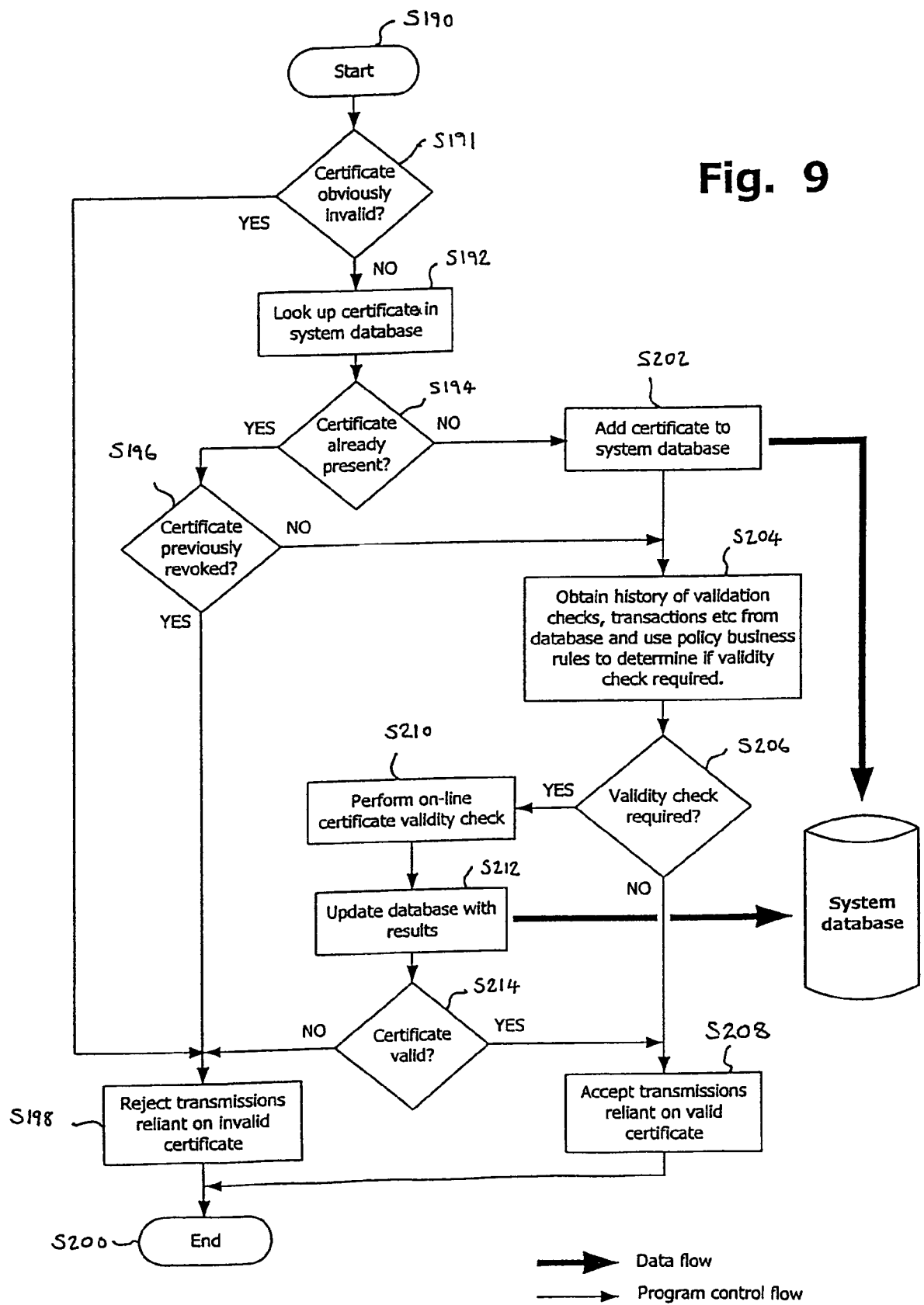
FIG. 9 is a flowchart illustrating the operation of a plug-in module, according to a preferred embodiment of the invention, for establishing the validity of a digital certificate received by a user.

FIG. 9 illustrates the operation of a plug-in module of the preferred system implemented to extract digital certificates from transmissions received by company employees and record them in a database along with their validity status and details of any associated transactions such as date, amount, goods and so on. The module first checks to determine if the certificate is obviously invalid, and that the message has been correctly signed by it. The certificate is obviously invalid, for example, if its expiry date has passed, or if it contains an invalid 'thumbprint'. Such a thumbprint may be a checksum for the certificate itself for example. The message has not been correctly signed if the signature cannot be verified from the information contained within the certificate. Details of certificate validation and message signing are more fully described in the ITU and RFC documents previously referenced. The module then makes a check to determine whether or not the certificate has already been stored in the database and only records those that have not. Where a copy of the certificate is already stored, the module checks the database record to determine whether it has been previously identified as revoked in which case the transmission is immediately rejected. Otherwise, the module then determines, in accordance with policy defining business rules, whether or not to validate the certificate. Taking in to account the results of any such validation, it then determines whether the certificate should be relied upon, and therefore whether or not the transmission signed by the digital certificate should be rejected or accepted. The module is initiated at step S190, following receipt of data containing a digital certificate. Digital certificates are typically transmitted as attachments to messages and may be identified by examining the first few bytes in the header of the attachment. These bytes identify the type of file attached and so will indicate whether an attachment is a digital certificate or not.

The initialisation step S190 occurs after point A in FIG. 3 if the module is implemented in a web browser, and after point A in FIG. 5 if the module is implemented in an e-mail client. Following initialisation, the module proceeds to step S191 in which the expiry date of the certificate is checked, and the digital signature confirmed as having signed the message. If the certificate has expired, or the message is incorrectly signed, the module proceeds to step S198 and rejects the transmission. Otherwise the module proceeds to step S192 in which the database is searched for a previously received copy of the digital certificate. Control then passes to decision step S194. If a copy of the certificate has been found in the database then control passes to decision step S196 where the module determines whether the certificate has previously been marked as revoked. This will have occurred if a previous validity check revealed that a digital certificate has been revoked. If the certificate is not already in the database control passes from step S194 to step S202 where the new certificate and the date on which it was received are stored in the database, together with additional details such as the address from which it was sent and details of any transaction associated with the transmission such as monetary value, account number etc. If the certificate has already been marked as revoked in step S196 then control passes directly to step S198 in which the transmission comprising the digital certificate is automatically rejected. This may involve for example, transmitting an automatically generated message to the initiator of the transmission whose certificate has been found invalid to explain the refusal, and preventing the recipient of the digital certificate from taking any further steps in connection with the refused transmission. The module then exits at step S200.

If, however, the certificate has not been previously marked as revoked in step S196, then control passes to step S204 in which the history of transmissions signed by the certificate, by other certificates from the same company, or used to conduct transactions on the same account are considered with policy data to determine if an on-line validity check of the certificate is required. Control also passes to step S204 after a new digital certificate has been added to the database in step S202.

The policy data contains instructions which when considered in conjunction with the history of signed transmissions previously received and revocation checks previously made indicate whether or not the certificate used to sign a transmission should be verified on this occasion. Example policy data is illustrated in FIG. 10 to which reference should now be made.

The policy data is stored on the AcceptanceConfidenceRating branch on the DigitalCertificates branch of the policy data representation. The AcceptanceConfidenceRating branch sub-divides into two separate branches which deal individually with 'monetary' digital certificates, where a certificate has been used to sign a transmission involving a transaction with the recipient for an amount of money, and "identity" digital certificates which do not involve a monetary transaction with the recipient of the transmission. Certain certificates are issued only for use in conjunction with monetary transactions. For example, the 'warranty certificate' issued by some on-line banking organisations, such as Identrus, as a warranty to the receiver of the signed transmission.

Such warranty certificates testify that the sender of the transmission is a customer of an Identrus member bank, and that if he or she does not make payment, the bank will accept liability.

Organisations which issue different kinds or classes of digital certificate mark each certificate according to its class. Identifying a certificate as being of a particular class is then a matter of knowing how different organisations classify their certificates and searching for the appropriate indicator in the certificate received.

Issuers of digital certificates may provide many different classes of certificate suited for different purposes. These may be separately dealt with by the policy data by corresponding sub-branches of the policy datatree.

In the example policy the first branch entitled "IdentityCertificates" deals with transmissions that do not involve a monetary transaction. The branch comprises four separate sub-branches. The first of these, entitled "AlwaysAcceptFrom" contains a reference to a table, 'table a', which lists the names of individuals and organisations who are considered to be reliable. The names listed in this table will be those known and implicitly trusted by the company, for whom, it is not considered necessary to determine whether or not a digital certificate has been revoked by its issuer.

The second branch entitled "AlwaysCheckFrom" contains a reference to a separate table, table b, in which the names of organisations and individuals for whom digital certificates should always be checked are stored. Clearly, the contents of table a and table b will depend upon the experience of the user of the preferred system and will be left up to that user to enter.

The third branch entitled "CheckItDaysSinceCertificateReceived FromCompany" specifies a period of time following the receipt of a valid digital certificate from a company, within which checks of any further digital certificates received from that company are not considered necessary. In this case, the period of time is set to be 10 days.

The fourth branch entitled "CheckIfDaysSinceLastReceivedThis Certificate" specifies a similar time period in the case of an individual digital certificate. In the example shown the policy data specifies that validation checks on any given digital certificate need only be made every 30 days. Again, the number of days specified on both of these branches is left to the user of the preferred system to decide. The amount of time that has passed since a valid digital certificate has been received may be determined by referring to digital certificates and associated data stored in the database. By checking digital certificates periodically, rather than each time they are received allows money spent on making checks to be saved. The MonetaryCertificates branch also contains an AlwaysAcceptFrom and an AlwaysCheckFrom branch which refer to tables x and y respectively. Table x lists all those organisations and individuals for whom no status check of a digital certificate is required; table y lists all those for whom a check is always required. The MonetaryCertificate branch also contains a CheckIfAmountExceeds branch which specifies a threshold transaction amount over which all digital certificates must be checked and lastly an IfRecentlyChecked branch which sets out two conditions for performing checks on a digital certificate that has been recently received and validated. The IfRecentlyChecked branch allows the user to specify that digital certificates received for transactions for a small amount, in this case $5000, received within a specified time, in this case 30 days, of a previous revocation check, need not be validated.

Figure 11:
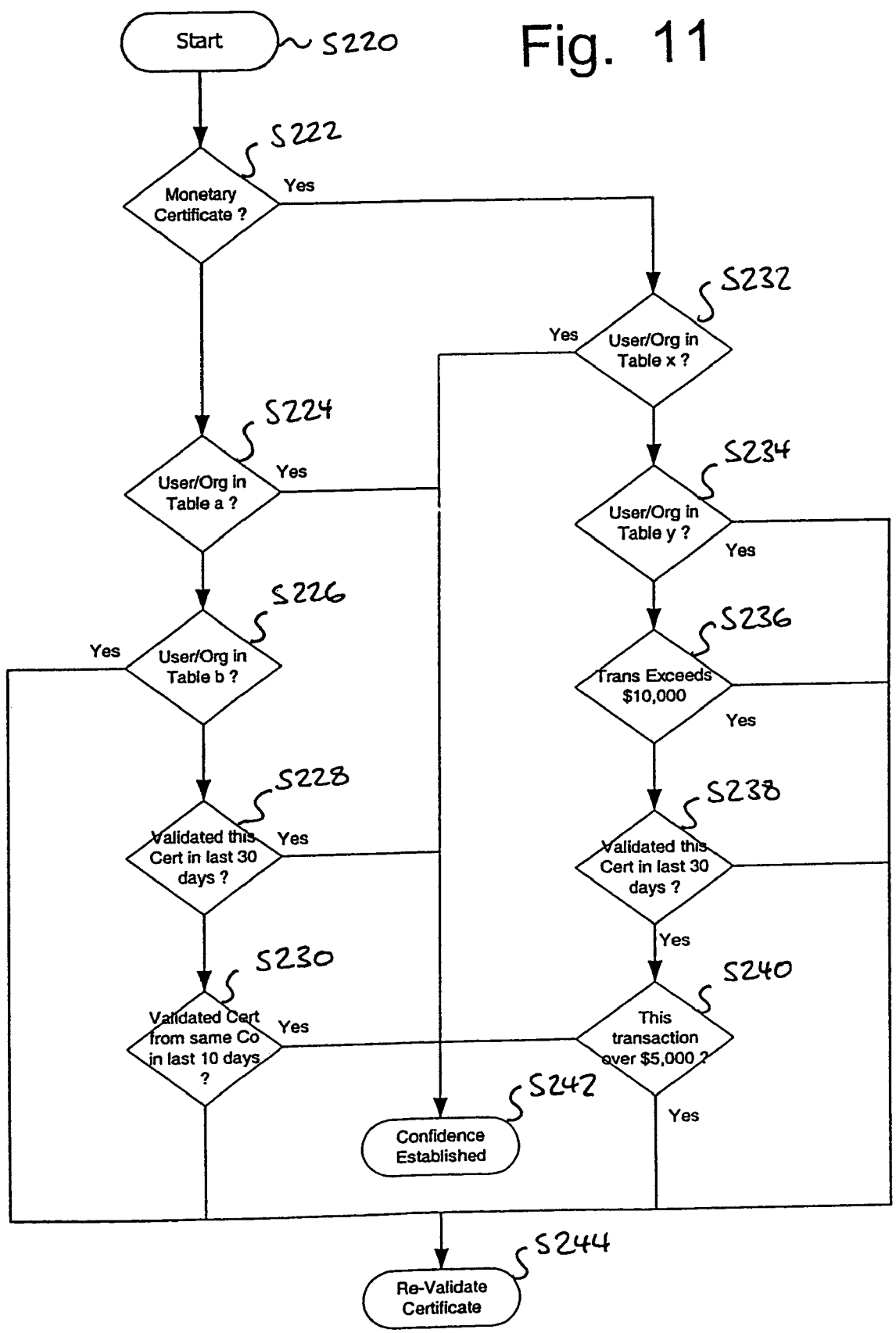
FIG. 11 is a flowchart illustrating how the example policy data shown in FIG. 10 is used to determine whether or not to verification is required for a digital certificate.

FIG. 11 illustrates the plug-in module process which interacts with the policy data shown in FIG. 9. This process is a sub-process of that shown in FIG. 8 and occurs at step S204 resulting in decision step S206 in which the plug-in module determines whether or not to perform an on-line check of the status of the Digital Certificate it has received. The sub-process begins in step S220 from which control passes to decision step S222 in which it is determined if the transmission is monetary from the class of the Digital Certificate used to sign the message. If the transmission is monetary then control flows to decision step S232, which is the first in a chain of decision steps corresponding to the branches in the MonetaryCertificates branch of the AcceptanceConfidenceRating branch of the policy data.

If in step S222, it is determined that the transmission is not monetary, control passes to decision step S224, which is the first decision step in a chain of decision steps corresponding to the IdentityCertificates branches of the AcceptanceConfidenceRating branch of the policy data. In each of the decision steps in the chain a simple check is made to see whether the conditions specified on each sub-branch of the IdentityCertificates branch of the policy data is satisfied. Depending upon the results of that check control flows either to step S242 in which confidence in the Digital Certificate is established and no on-line check of the Digital Certificate's status is deemed necessary, or step S244 in which confidence is not established and an on-line check is deemed necessary, or to the next decision step in the chain.

Thus, in decision step S224, in which it is determined whether the sender of the Digital Certificate is listed in table a, that is the "AlwaysAcceptFrom" table, if the sender of the Digital Certificate is listed in Table A then control flows from decision step S224 to step S242 where confidence is established in the Certificate and the sub-process ends returning to step S208 in FIG. 8. If the sender is not listed in table a then control flows from step S224 to the next decision step in the chain step S226 in which it is determined whether the sender of the Digital Certificate is listed in table b, that is the "AlwaysCheckFrom" table. Similarly, if the sender is listed in this table control flows to step S244 at which an on-line check of the Digital Certificate's status is deemed necessary. Control returns from step S244 in the sub-process to step S210 in FIG. 8.

If the sender of the Digital Certificate is not listed in table b then control flows from decision step S226 to the next decision step in the chain which represents the next condition listed as a sub-branch listed in the policy data. Thus, in decision step S228 a check is made as to whether this Digital Certificate has been validated in the last 30 days. This will involve looking up the Digital Certificate in the database of stored Digital Certificates and extracting from the stored information the date on which the Digital Certificate was last checked. If the status of the Digital Certificate has been checked in the last 30 days, control flows to step S242 where confidence is established. If the information in the database of stored Digital Certificates indicates that the Digital Certificate has not been checked in the last 30 days then control flows from step S228 to decision step S230 in which a check is made to see if another Digital Certificate has been received from the same company and if that Digital Certificate has been checked within the last 10 days. This determination again involves checking the database of stored Digital Certificates and information relating to those Digital Certificates. If the other Digital Certificate has been checked in the last 10 days then control flows to step S242 where confidence in the received Digital Certificate is established. If not, then control flows to step S244.

In the case of a monetary transmission, the conditions set out on the policy data are stepped through in decision steps S232 to decision step S240. If in decision step S232 the sender of the Digital Certificate is found to be listed in table x, which sets out the names of companies and organisations for which no check of the Digital Certificate status is deemed necessary, then confidence is established and control passes to step S242. Otherwise control passes to the next decision step in the chain which is decision step S234. At decision step S234 if the sender of the Digital Certificate is founded listed in table b, that is the "AlwaysCheckFrom" Table, then confidence is not established and control passes to S244. Otherwise, control passes to decision step S236, where it is determined whether the amount for which the transaction is being made exceeds $10,000. This determination is made with reference to the signed transaction data which will contain the monetary amount either in a manner pre-determined by the issuer of the certificate, or contained within the e-mail or associated e-mails forming the transaction or transmissions. If the transaction is found to be for an amount to be in excess of $10,000, or if the amount of the transaction cannot be determined with a reference to the data transmitted, then confidence is not established and control passes to step S244. Otherwise, control passes to decision step S238 in which it is determined whether the Digital Certificate has been checked within the last 30 days. Again, this determination is made with reference to the database of stored Digital Certificates and data relating to Digital Certificates. If the certificate has not been checked within the last 30 days then confidence is not established and control passes to step S244. If it has been checked, then control passes to decision step S240 where, if the previously determined amount of the transaction is deemed to be over $5,000 then confidence is not established and control passes to step S244. If the amount of the transaction is under $5,000 then it is classed as an acceptable risk to rely on the Digital Certificate, confidence is established and control passes to step S242.

These last two conditions allow the system to determine whether to check the certificate's status based on recent trading history. If for example, a transaction is about to be made by a party for a modest sum, i.e. under $5000, and the search of the recorded transaction and certificate details reveals that quite recently, the same party made a transaction and at that time their digital certificate was confirmed as being valid, then it is arguable that checking the validity of the party's certificate again so soon after the first is unnecessary, and it is preferable to trust in the party rather than paying the validation fee a second time.

It will be appreciated that the instructions in the policy file may be set out to reflect the level of confidence the company has in its customers or suppliers, based on the experience of individuals within the company, the amounts of transactions that are deemed allowable without significant risk and so on. The policy file may also be set up to implement more general policies which are to be used in conjunction with a record of transaction details for the holder of that digital certificate. For example, any transaction that is offered by the holder may be compared against the record of those that he has made before to see if the amount and the goods and services requested are in keeping with his trading history. If they are not, then it may be desirable to check the validity of the certificate to confirm that it is still valid and guarantees the identity of the sender. If it has been revoked, then a third party may have acquired the original holder's private key and be attempting to make fraudulent transactions.

Having checked the policy data in step S204, confidence in the digital certificate will either have been established or will not have been established. In decision step S206, if confidence has been established then control passes to step S208 in which the transmission containing the transaction is accepted. Control then passes to step S200 where the module exits and control passes back to point A in FIG. 3 in the case of a web browser, or point A in FIG. 5 in the case of an e-mail client.

If in step S206 confidence in the digital certificate is not established, then control passes to step S210, where an on-line validation check is performed on the digital certificate. This may involve checking to see whether the Digital Certificate has been revoked or whether, in the case of an eCommerce transaction, the issuer of the Digital Certificate will confirm a warranty for the amount promised in the transaction. Control next passes to step S212, in which the validity status stored in the database for that certificate is up-dated. Control then passes to decision step S214 in which, if the certificate was found invalid, control passes to step S198 where the transmission is rejected, or to step S208 where the transmission is accepted. Rejection of the transmission may mean that it is deleted from the recipients mail box before it has been opened, or that the transmission is marked with the word 'rejected' or some other indicator. Following either of steps S198 or S208, control passes to step S200 where the module exits. Whenever a transaction is allowed to proceed the database is updated such that it includes information about the transaction, such as date and amount, in order that the information may be used in determining the need for future validation checks.

Recording of Information.

The preferred system also provides an automatic way in which to record transaction information for transactions carried out on-line. In this context, the word "transaction" and "eCommerce transaction" are intended to mean an agreement promising money or money's worth made between two parties over the Internet, or even over the same network of a company. Normally, the user himself is responsible for maintaining transaction information by making hard copies of the relevant electronic records or by actively storing copies of any electronic records in files on his computer. The reliance on manual methods to ensure these records are maintained is clearly both unreliable and labour intensive.

The preferred system on the other hand scans the information content of all communications processed by the system for indications that a transaction has begun or is taking place. Such indications are numerous. The most straightforward is whether the link is secure or not as most web pages negotiate a secure link before a transaction is carried out and close that link afterwards. Determining whether a link is secure is achieved by examining the URL of the destination web page. A secure link is indicated by an 's' after the prefix 'http'. Thus, one mode of operation of the preferred system is to record all data transmitted to a web page while a link is secure. The preferred system also maintains a record of web pages that negotiate secure links but that are not eCommerce sites, i.e. those that are connected to other than to make purchases, and not record any data transmitted to these pages. Such a web page might be Microsoft's Hotmail web page which provides an e-mail service.

Another indication might be simply the URL of the site. In this case the preferred system may be configured to record all data transmitted to a web page which has been identified as that of an on-line trading company. Other indications might be an identified credit card number, an electronic receipt, an e-mail acknowledging the sale, use of a digital certificate, in particular a digital warranty certificate, or a purchase code.

Once a transaction has been identified as occurring, the preferred system may record the details of the transaction by both storing in entirety each communication between a user and the identified trader, or by scanning the transmissions and extracting particular details, such as date, amount, type of goods, quantity and so on.

Recording of transaction data may be stopped when the end of the transaction is identified or after a predefined number of transmissions between the purchaser and the trader have taken place. Similarly, once a transaction has been identified, the preferred system may record in the database a predefined number of cached transmissions that took place immediately before the first recognised transmission of the transaction.

This will be useful when, for example, the first indication that a transmission is occurring is the detection of a credit card number or an electronic receipt, since these are likely to received at the very end of a transaction. The prior transmissions may, for example consist of web pages containing information regarding the goods or services being purchased, or an exchange of e-mails where specification or delivery terms were agreed. Note that it is perfectly possible for the prior transmissions to be of the same type as that in which the transaction was detected, of a different type, or be a mixture of types. For example a user might visit a web site www.abc.com, obtain details of goods, and then order them in an email sent to orders@abc.com.

The preferred system records the transaction details in a centralised common database 42. Additionally, the database may be a local file or a service on a network. The information stored in the database may be encrypted using known encryption techniques so that only a person with the necessary authorisation may access it.

Figure 14:
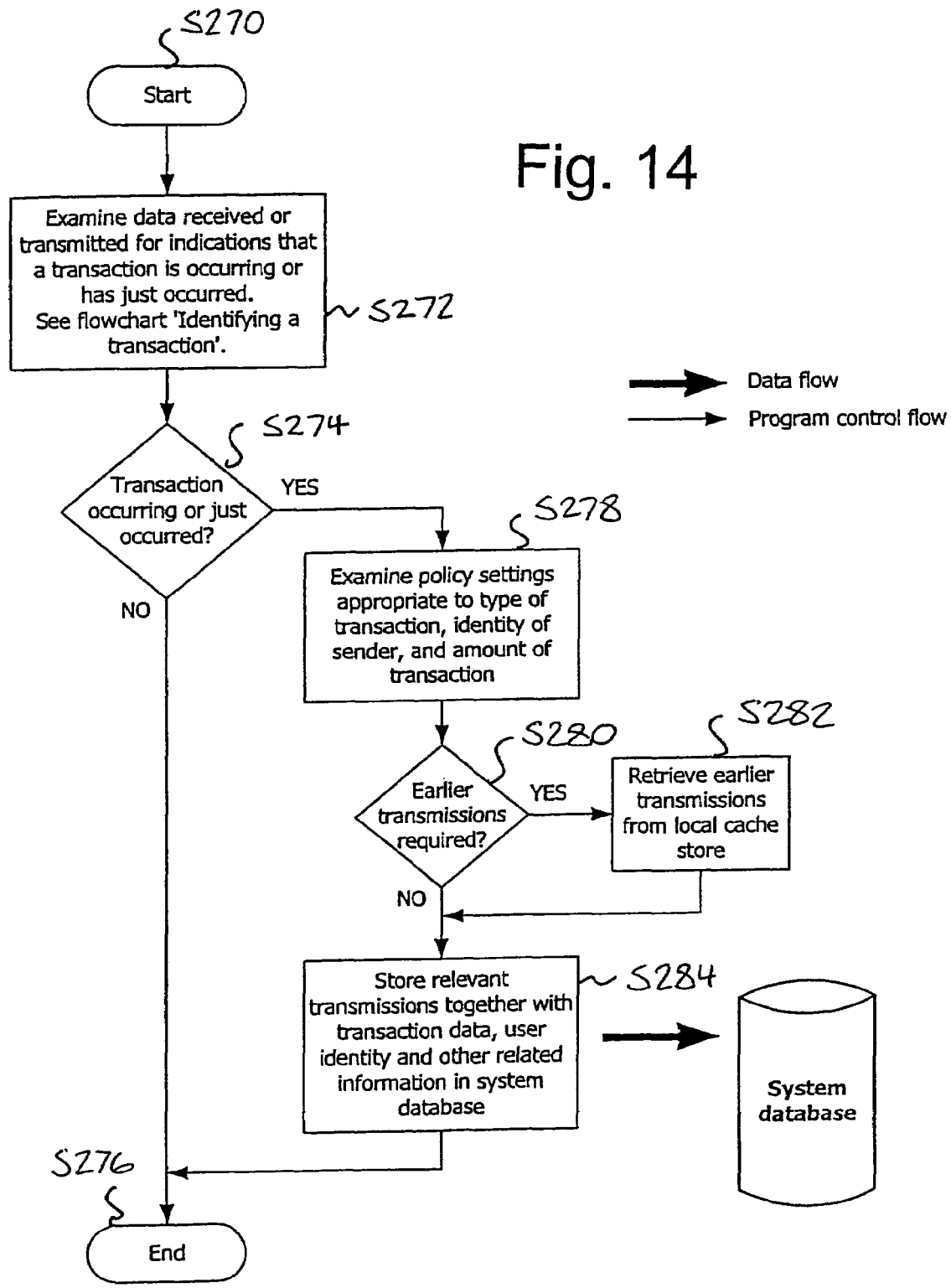
FIG. 14 is a flowchart illustrating the operation of a plug-in module, according to a preferred embodiment of the invention, for recording transmissions identified as comprising part of a single transaction thereby forming a record of the transaction.
Figure 15:
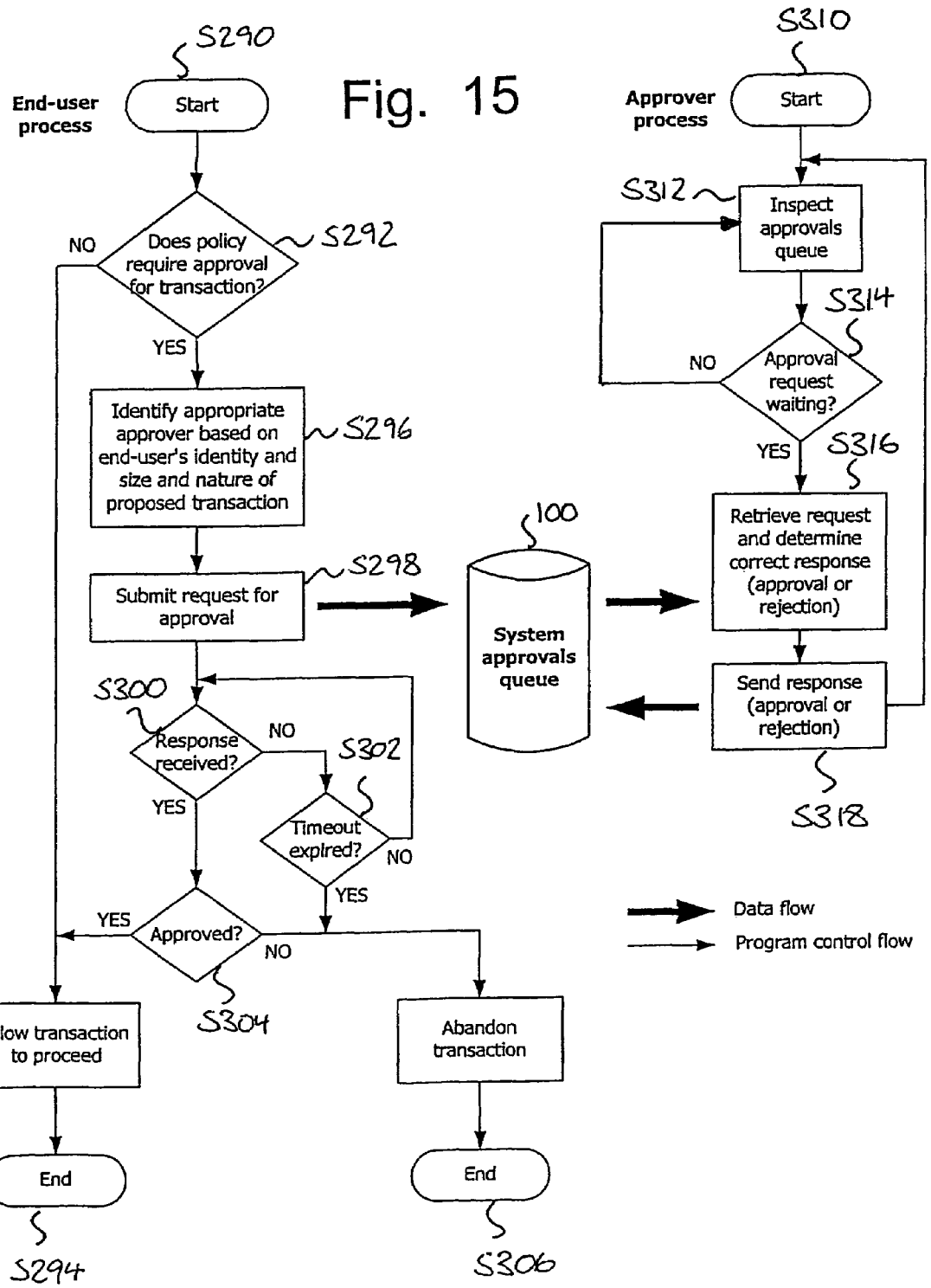
FIG. 15 is a flowchart illustrating the operation of a plug-in module, according to a preferred embodiment of the invention, for approving or rejecting identified transactions on the basis of a predetermined policy setting.

FIG. 12 is an illustration of the operation of an example implementation of a module for identifying when an electronic transaction is being conducted on-line. FIG. 14 illustrates the process by which the preferred system records an identified transaction in the database, and FIG. 15 illustrates how the preferred system allows an identified transaction to be approved or rejected on the basis of a predetermined approvals policy.

With reference to FIG. 12, the operation of a module for identifying when an on-line transaction is occurring will next be described.

The module begins operation at step S250 in response to receiving data or in response to a user initiating transmission of data to a remote site. In the case of a web browser implementation this will be after point A or after point C respectively as shown in FIG. 3; in the case of implementation in an e-mail client it will be after point A or B respectively as shown in FIG. 5.

Control then passes to decision step S252 in which it is determined whether, in the case of a web browser, a secure link has been negotiated between the site transmitting data and the site receiving data. This may be achieved by querying the URL address that has been connected to, as mentioned above, or interrogating the web browser to see if encryption is being employed. In the case of an e-mail message this step is omitted and control passes directly to step S260. Since on-line web browser transactions usually involve the transmission of personal information, such name and address, credit card number or other account identifying information, secure links are usually negotiated as a matter of course. Thus the presence of a secure link alone is a good indication that a transaction is taking place. However, secure connections may be negotiated for reasons other than the transmission of transaction details. Thus, if in step S252 it is determined that the connection is secure, control passes to step S254, in which the address of the remote site to which the connection has been made is checked against a list of known sites which do not provide facilities for conducting on-line transactions but which do establish secure connections. Browser based e-mail sites such as Microsoft's Hotmail site is one such example. Control then passes to decision step S256 where a determination based on the previous check is made. If the site address is identified as a non eCommerce site, that is one which does not facilitate the making of a transaction, then it is determined that a transaction may or may not be occurring and control passes to decision step S260 to make further checks on the transmission content. If in step S256 the site address is not identified as a known non eCommerce site, then it is assumed that an on-line transaction is occurring, and the module exits at step S258.

If a secure connection is found not to have been established at step S252, or if a secure connection has been established but to a known non-eCommerce site, as determined at step S256, or the transmission is an e-mail, then control passes to decision step S260. In decision step S260, the first of a number of checks on the content of the transmission are made in order to determine whether or not it is part of a transaction. In step S260, the transmission is scanned to see if it contains a credit card number. The method for doing this has been described with reference to FIG. 8. If a credit card number is found in the transmission then it is assumed that a transaction must be occurring and control passes to step S258 at which the module exits. If no credit card number is found then control passes instead to decision step S262 where the transmission is scanned to see if it contains an account code. Account codes may be (for example) stored in a separate file which is accessed by the module when performing this step or alternatively an account code may be identified from descriptive data in the transmission such as a field name like "Account Number" or similar characters appearing in the text of a message.

If in decision step S262 an account code is found, then it is assumed that the transmission constitutes part of a transaction and control passes to step S258 where the module exits. If no account code is found then control passes to step S264 where, in the case of a web browser, the URL is compared with a list of known eCommerce URLs stored in a file or in a database. In decision step S266, a determination on that comparison is made. If the URL is found to be at a known eCommerce page, or within a known set of eCommerce pages, then it is determined that an eCommerce transaction is taking place and control passes to step S258 where the module exits. Similarly, in the case of an e-mail, the destination address may be compared against a list of known eCommerce e-mail addresses, for example 'orders@abc.com', and if a match is found then it is determined that an eCommerce transaction is taking place and control passes to step S258 where the module exits.

The checks that have been described are only representative of the possible checks that could be made to determine whether or not a transmission is likely to be part of an eCommerce transaction and are not intended to be exhaustive. Furthermore, the order in which the checks have been illustrated has no special significance. The order is simply dependent on the structure of the policy data as will be seen from reference to FIG. 13.

In step S268, a general check is illustrated which represents any further check for an indication of a transaction, in addition to those described above, which a company decides it is desirable to employ, such as searching for purchase codes or embedded codes placed in the data for example. It is preferred that the web browser or e-mail client being used in the preferred system allows the user to mark transmissions with an embedded code to indicate that the transmission is part of a transaction and should be recorded. Also, the embedded code could be placed in the data by the web site or the e-mail client transmitting some of the transaction data to the user's workstation.

Control passes to this step after step S266, if the site is not recognised as a known eCommerce site and if such a transaction indicator is found in step S268, then a transaction is deemed to be occurring and control passes to step S258 where the module exits. If at step S268, no such indicator is found then no transaction is deemed to be occurring and the module exits at step S258. Following exit, the data may be transmitted, following points C and B in FIGS. 3 and 5 respectively, or be processed following on from its receipt at point A in FIGS. 3 and 5.

In the example described, the aim is to start recording transmissions and possible transaction details if there is just a suspicion that a transaction is occurring. It is assumed that recording data which is not part of a transaction is preferable to not recording a transaction at all FIG. 13 is an illustration of the policy data used to identify that eCommerce transaction is occurring and to control the way in which the transaction data is recorded. The policy data is represented by a Transactions branch of the policy data tree which sub-divides into two separate sub-branches called "Identification" and "Termination". The Identification branch is itself divided into five sub-branches which correspond to the determinations made in the process illustrated in FIG. 12. The first of these sub-branches entitled "IfConnectionGoesSecure" allows a user to specify whether recording should start when the plug-in module detects that the connection to the web server has become secure. The conditions specified on the this sub-branch corresponds to decision step S252 shown in FIG. 12. It will be appreciated with reference to FIGS. 12 and 13 that the flow of control shown in FIG. 12 corresponds to the layout of the conditions specified on the branches of the policy data tree shown in FIG. 13. The ExcludedSites branch of the IfConnectionGoesSecure branch contains a reference to table q in which the web sites known to negotiate secure sites but which are known not to be eCommerce web sites are listed. Table q is referred to in step S256 of the process shown in FIG. 12.

The next sub-branch of the identification branch is entitled "IfCreditCardNumberPresent" and allows the user to specify whether the detection of a credit card number should or should not be used to initiate recording of data being transmitted or received. This sub-branch corresponds to decision step S260. The PreviousPages sub-branch of the IfCreditCardNumberPresent branch lists the number of web pages, prior to the web page in which the credit card number was detected, which should also be recorded. Since credit card numbers are normally submitted at the end of the transaction, the provision of this sub-branch enables previous web pages which are likely to contain the details and request of the transaction to be retrieved and stored. These web pages are cached continuously by the preferred system so that should a transaction be identified they may be retrieved from the cache and stored in the database. This will be explained in more detail with reference to FIG. 14.

The next sub-branch of the Identification branch tree is entitled "IfAccountsCodePresent" and allows a user to specify whether or not the detection of an account code in the data being transmitted or received is to be taken as an indicator to initiate recording of the data. The accounts codes are identified in step S262 shown in FIG. 12 by reference to table r. The reference to this table is contained in the AccountCodes sub-branch of the IfAccountCodePresent branch. Note that this table also shows the number of previous pages to record, in a similar manner to that described above for credit card identification, however in this case the number of previous pages to record is stored in table r allowing a different number of pages to be specified for each detected account code.

The IfKnownECommerceSite branch allows the user to specify a list of URLs corresponding to sites, parts of sites, or even single pages, where eCommerce transactions are known to take place. The current page URL is matched against entries in this list to determine if a transaction is taking place. The KnownSites sub-branch contains a reference to tables in which the URLs of known eCommerce sites are stored. The determination of whether the URL of the web site is a known eCommerce site is made in decision step S266 following step S264 of FIG. 12. Lastly, the IfOtherIndicatorPresent branch provides a way for the user to specify whether or not the determination of other indicators should be used as a starting point for the recording of data. Two sub-branches of this branch entitled Key Words and PreviousPages specify possible indicators that may be detected, in this case key words listed in table t, and also the number of previous pages that are required to be stored if key words are detected.

The Termination branch of the Transactions branch divides into four sub-branches which specify conditions which are used to end the recording of data being transmitted or received. Each sub-branch sets out a condition by which the end of the transaction may be defined. The first branch entitled "IfConnectionGoesInsecure" allows a user to specify that the relinquishing of a secure connection by the web browser indicates the end of a transaction so that recording should be stopped. The other sub-branches specify that when the web site changes recording should stop, if a digital receipt is received recording should stop and recording should stop after the receipt of 20 web pages following identification that a transaction is occurring.

It must be stressed that policy data shown in this diagram, in particular, but also in the other diagrams is unique to each user. Not only may a user specify whether or not particular conditions are to be acted on by setting the Yes or No variable accordingly, or by changing the number of pages that are to be recorded for example, but also the structure and arrangement of branches and conditions specified on those branches may be different from user to user. It will be appreciated that while the example policy describes recording of transactions in a web browser environment, a similar policy would control the e-mail environment, omitting the secure connection option, but allowing policy to be defined for recording e-mails on detection of credit card numbers, account codes or other identifiable information within them, or where e-mails are sent to known eCommerce addresses.

The full benefit of the method for identifying a transaction is realised when the method is utilised along with means for recording transmissions between a user of the preferred system and a remote site. This allows a record of all transactions carried out by a user to be kept and maintained automatically. The records may be kept up to date without the need for making paper copies of each transmission received or sent. Thus, a company's record keeping is made considerably easier and more accurate.

FIG. 14 illustrates the operation of a module for recording transmissions which comprise a transaction. The module is initiated at step S270.

If the module is implemented as part of a web browser, step S270 is initiated at point A in FIG. 3 after the receipt of data or after point C in FIG. 3 directly before transmission data to remote site. If the module is implemented as part of an e-mail client step S270 occurs after point A in FIG. 5 after an e-mail has been received or after point B in FIG. 5 just before an e-mail composed by the user is sent to a recipient. Following step S270, control passes to step S272, in which the test for identifying a transaction, described above with reference to FIG. 9, is performed and a determination is made as to whether an eCommerce transaction is occurring or not. Control then passes to decision step S274 where, if it is determined that no transaction is occurring control passes directly to step S276 where the module exits.

If a transaction is determined to be occurring however control passes to step S278 in which the policy is consulted against one or more of the means of detection, the identity of the sender, the amount of the transaction, or other parameters to determine which prior transmissions, if any, should be stored with the identified transmission, and in how much detail the transmission should be recorded. The policy might, for example, require that a transaction involving a large sum of money be recorded in more detail than a transaction for a small sum. An example of this in operation might be the recording of every web page accessed during the making of a transaction on an on-line trader's web site for transactions involving large sums of money, but only recording the transmission containing an electronic receipt for transactions for smaller amounts.

As well as determining the amount of data to be stored, the policy file may also determine the nature of the data to be recorded. The entire transmission or web page may be recorded as a series of snap shots of the transaction, in the same way as web pages are stored in cache memories for example, or alternatively, individual items of data, such as the date, the trader's identity, the amount and so on, may be extracted from the transmission or web page, and stored either on their own or together with the snap shot data.

In this way, memory for storage can be used most effectively to ensure that the most important transactions have sufficient space to be recorded. The amount of transaction data to be recorded may also depend on the trader's identity, geographical location, trading history with the user's company, and the goods and services on offer.

In FIG. 13, the example policy data shows a simple scenario in which the amount of data to record is specified in terms of the number of web pages that are to be retrieved from the pages cached in memory. The number differs depending on whether a credit card number, an account code or a keyword is identified. Furthermore, table r shows that with the recognition of different account codes the number of previous web pages to store might be different, reflecting the relative importance of the account.

Extending this simple case to a more sophisticated one may be achieved by providing a higher level of detail in the policy data. Additional branches to the policy data tree could specify company or individual names, or specific keywords relating to goods and/or services; the amount of data to record depending on these keywords and names as well.

Also, the tables might be expanded to refer to the amount of different types of data that should be stored. Data such as the company name, what was being sold, the quantity and so on could be extracted from e-mail text, from the HTML text defining the web page, or from the DOM representation of the web page and stored in the database.

All web pages or information stored in the cache may be retrieved, or alternatively the system may retrieve only pages that have details in common with the page initially identified as being part of a transaction.

Alternatively, a list of all stored messages may be presented to the user for the user to manually select those transmissions which relate to the identified transaction.

Following determination of how much data to record control passed to decision step S280. In step S280 if earlier transmissions, are to be stored, control passes to step S282 where the transmissions stored in the local cache are retrieved. In the case of a web browser, this may be a determined number of prior pages, as described above. Where the transaction was detected in a web browser, policy may also dictate that the cache is searched for prior e-mail messages relating to the transaction, for example sent to or received from the same organisation. This may be determined by matching portions of the browser URL to portions of the e-mail addresses. Similarly, transactions detected in e-mail messages may cause both prior e-mails and prior web pages to be retrieved from the cache. Control then passes to step S284 in which the identified transaction and any retrieved prior transmissions are stored in the system database 42.

In step S280, if earlier transmissions are not required, control passes directly to step S284 where the transmission identified as a transaction is recorded in the system database. At the same time as the transmissions are stored in step S284, related data such as the user identity, the amount and the other party to the transaction may also be recorded in the system database to form a complete record, although this will depend on the instructions of the policy data. Control then passes to S286 and the module exits.

Following on from step S276 after the module exits, the data may be transmitted, following point A in FIGS. 3 and 5, or be processed following on from being received at points C and B in FIGS. 3 and 5 respectively.

Once a transmission has been identified as taking place all transmission between the user and the other party may be recorded until the system detects that the transaction has been completed. Detecting the end point of a transaction and stopping recording may be done in a manner similar to that described above for identifying whether a transaction is taking place. The most simple implementation is to record transmission information until an electronic receipt or shipping order is received. Alternatively, recording of transmissions may caused to stop after a pre-determined number of transmissions between the user and the other party have occurred, or if a certain amount of time has passed since the transaction was identified.

Transmissions may be made simpler if each time the user changes web site the cache is emptied. This keeps the memory required for the cache memory low, as well as reducing the number of previous transmissions that need to be searched if searching techniques are to be employed.

It will be appreciated that the methods described above can also be used to record associated transmissions which occur after a transaction has been detected and recorded. For example, a transaction made using a web browser will typically be followed by a confirmatory e-mail sent from the seller to the buyer. This e-mail can be detected as forming part of the transaction, since it will contain common characteristics, such as order number, account number, goods description, price etc. It may also be sent from an address similar to the web site address, for example 'customerservices@abc.com' when the original web site used to make the purchase was 'abc.com'. A time element is preferably used such that only subsequent transmissions which occur within a given time period are considered as being associated with the original transaction.

The preferred system also provides means for monitoring transactions that are being made and automatically referring the transaction for approval if that is deemed necessary. This process allows a large company to monitor and control the transactions being made by its employees using a single set of criteria set out in the policy data. The policy data may be referred to each time a transaction is identified in order to determine whether the user is authorised to make that transaction himself or whether he needs to request authorisation from higher up in the company. The process is illustrated in FIG. 15 to which reference should now be made.

The module embodying this process is initiated at step S290. This initiation preferably takes place as soon as all relevant details of the transaction which need to be considered have been determined, and before the transaction is committed. In the case of an e-mail transaction, details such as goods and price are typically contained within a single e-mail and can be considered prior to transmission of that e-mail. In the case of a web browser transaction, the existence of transaction may be detected before all details are known, in which case initiation does not take place until they are. This does not normally present a problem as final commitment does not occur until the very end of the transaction process, well after all relevant details are known. Detection of the transaction and relevant details may be determined in the manner described above with reference to FIG. 12. Referring briefly to FIGS. 3 and 5, it will be seen that step S290 occurs after point C in FIG. 3 in the case of web browser implementation, or after point A in FIG. 5 in the case of e-mail client implementation once the required details are known.

Control passes from step S290 to decision step S292 in which the details of the transaction are compared against the policy settings to determine whether or not approval is required. The determination may be based on the identity or the position of the employee making the transaction, the amount of the transaction, or the other party in the transaction. In some instances, approval might always be required, such as if the financial director of a company wishes to review each transaction before it is made.

FIG. 16 is an illustration of example policy data that may be used to determine whether or not a transaction requires approval from a third party and also to determine the identity of an appropriate approver who is to be used. In this case, conditions in the policy data stipulate whether approval is required depending on the transaction amount, and the URL address of the other party to the transaction.

The relevant policy data is set out on the Transactions Approval branch of the policy data tree. This branch subdivides into four sub-branches. The first branch is entitled "MaximumUnapprovedTransactionA- mount" and defines a threshold amount for transactions. Transactions for amounts over the threshold must be approved by an approver before they are made.

The second sub-branch entitled "MaximumUnapproved-MonthlyAmount" defines a maximum amount for transactions that a user may make within a month. In this case, any transaction made by the user which would cause the monthly total to exceed $2,500 will require approval from a third party, as will further transactions made after that threshold has been reached.

The third branch entitled "ExcludedSites" refers to a table containing web site and e-mail addresses of all sites which always require approval from a third party before a transaction may be made. Finally, the last branch entitled "Approvers" refers to a table in which the names of possible third party approvers are listed. Along side each name is the maximum transaction amount for which that approver has the authority to approve, and a list of excluded sites for which that approver may not approve a transaction. In the simplest of cases, approvers will be other computer users logged in on the same network as the user making the transaction such as department managers, or supervisors. The approvers will, by nature of their role, be members of the trading company who assume and who have the authority to assume responsibility for the financial transactions the company makes. It is also possible that approvers might be drawn from a group of people who are employed primarily for this role, such as people in the financial department only.

If the conditions on the first three sub-branches of the transaction branch indicate that approval is required an appropriate approver may be found by scanning through the table of approvers until an approver whose transaction limit is equal to or greater than of the proposed transaction and who is not prohibited from approving transactions to the relevant site is found.

It will be appreciated that the example policy data shown in FIG. 16 is policy data that is specific to a single computer user, or group of users, in the network. Other users, or groups, may have different settings and a different list of approvers.

It will be appreciated that the conditions to determine an appropriate approver may be introduced by creating new sub-branches of the policy data tree.

The operation of the approvals process could for example be extended to any kind of transmission, not just those comprising an eCommerce transaction. Such operation may be implemented by having the conditions defined or the sub-branches of the policy data specify usernames, addresses or keywords for example that are to be identified in the transmission and acted upon. Thus, all e-mail transmissions to a particular company or individual may be caused to require approval, or all e-mails containing predetermined information recognised via keyword identification.

If it is determined in step S292 that no approval is required, control passes directly to step S294 at which the module exits. Following step S294 the transmission of the transaction is permitted and the transaction may be proceed. Control returns from step S294 to point C in FIG. 3 or to point B in FIG. 5.

However, if in step S292, after consulting the policy settings, it is determined that approval of the transaction is required, control passes to step S296 in which the particulars of the transaction are used to determine an appropriate approver for the transaction. The approver may be a company employee logged on at his workstation, or at a workstation with a dedicated approver function such as Operator consoles 44, as shown in FIG. 2, or may even be an automated process. In the case of a large company with a number of departments, it maybe advantageous to have a group of approvers for each department, each group monitoring the department's accounts. This allows transactions to be rejected before they are made if, for example if the department head decides that he wishes to temporarily suspend purchases, or purchases of a particular nature.

Control passes from step S296 following determination of an appropriate approver to step S298 where an approval request is transmitted to the designated approver via systems approval queue 100. Following step S298 control passes to decision step S300 where it is determined if a response from the approver has been received. A timer is started the moment a request for approval is submitted. If a response has not been received in step S300 control passes to step S302 where it is determined from the timer whether or not a time out period has elapsed. Providing the period has not elapsed, control passes from step S302 back to S300 where the system continues to wait for a response from the approver. Thus decision steps S300 and S302 form a loop in which the system waits until a response is received or until time out expires. In decision step S300 once a response is received, control passes to step S304 in which action is taken depending upon whether the transaction was approved or rejected.

If the transaction was approved control passes from step S304 to step S294 at which the module exits and the transmission is allowed to proceed. If however the transmission is not approved then control passes from step S300 to step S306 at which the module exits. Exiting at step S306 however prevents the transmission of the transaction from taking place and returns the user to point A in FIG. 3 in the case of web browser implementation or to step S132 "compose e-mail" in FIG. 5 in the case of e-mail client implementation.

Also, if in step S302 the 'time-out' is deemed to have expired without a response from the approver having been received then control passes directly to step S306 at which the module exits.

The right hand side of FIG. 15 shows the steps involved for the approver. The approval process is initiated in step S310, from which control passes to step S312 in which the approver's machine queries the systems approval queue for any new approval requests. Control then passes to decision step S314. In step S314 if no request is pending control passes back to step S312 where the system queue is polled once again. These steps are repeated until an approval request is received or until the approver deactivates the approval process.

In step S314 if an approval request is received, control passes to step S316 in which the approval request is downloaded from the systems queue and the approver himself decides whether to approve the request or refuse it. Control then passes to step S318 in which the approver's response is transmitted back to the system approvals queue and from there back to the users work station.

Control passes from step S318 back to step S312 in which the system approvals queue is queried for new approval requests. It will be appreciated that the approvals process could be entirely automated in some circumstances. For example, transactions may be automatically rejected if the company does not have sufficient funds, if they would cause budget amounts to be exceeded, or if they are simply over a maximum amount. Such automation could alternatively be provided as part of the user process, such that an approvals request is not even made.

Security

The preferred system provides means to assign an appropriate security rating to the transmission in dependence on the identified nature of the data being transmitted. The security rating assigned may be set by the user of the system using the policy data to reflect his needs.

The simplest implementation of the policy data in this case is a list containing in a first column possible types of data, such as employee passwords, employer passwords, credit card numbers, banking details and so on, and containing in a second column, the desired encryption strength (in key bits for example) deemed appropriate for each data type. It will be appreciated that other ways of assigning security levels in dependence on the determined nature of the data may also be employed within the scope of the invention.

FIG. 17 shows an example illustration of policy data defining appropriate encryption strengths for various types of data. The policy data takes the form of a number of key-value pairs arranged on separate branches of the policy data tree. The key specifies the type of data that is being transmitted such as passwords, credit card numbers, submitted key words and a general key for any other submitted data. The values that correspond to these keys are the encryption strength in bits that is deemed appropriate for the transmission of the data specified in the key. The key value pairs are arranged on several branches of the RequiredEncryptionLevel branch of the TransmittedDataSecurity branch of the policy data tree. Thus, in the example, it may be seen that passwords have a desired encryption strength of 40 bits, company credit card numbers and personal credit card numbers both have a desired encryption strength of 128 bits, submitted key words have a desired encryption strength of 40 bits and other submitted data requires no encryption.

The SubmittedKeywords branch refers to particular words or strings or text that have been designated as sensitive and requiring some form of encryption. These may be usernames, address information, financial information or pre-selected words such as "confidential" or "secret". The submitted keywords may be detected by referring to a table or file in which they are stored.

Furthermore, each branch of the policy data may, instead of giving a general encryption strength, refer to a table in which different passwords or credit card numbers, for example, are listed along with corresponding encryption strengths specific to each password or number.

Once a security rating has been assigned, the plug-in module interrogates either the web browser to determine the security of the link that has been established by the web browser with the web server for transmission of that information, or in the case of an e-mail transmission, the encryption settings that the user or application have determined will be applied to the message. Typically, this will be the cryptographic strength of the encryption algorithm used to encode the data for transmission. Such transmission details are received by the web browser as part of the 'electronic handshake' from the web service provider.

A secure link is usually indicated in a Browser window by the presence of a closed padlock icon in the bottom right corner. A user can click on the icon to interrogate the level of security that has been provided by the handshake. In doing so they may receive a notification of the form "SSL secured. (128 bit)". The first part of the notification describes the type of the encryption used while the second part describes the encryption strength. The plug-in module is implemented to automatically obtain this data from the browser so that it may be used to determine whether or not the security level is adequate for a proposed transmission. Similarly, in the case of an e-mail message, the plug-in module determines the encryption settings that the user or application has specified are to be used prior to transmission of the message.

The module compares the specified encryption strength with that of the link or message and depending on the result of the comparison performs one of the following actions:

a) If the security of the link is appropriate for the nature of the information being transmitted, the module allows the information to be transmitted;

b) If the security of the link is more than that required for the transmission of the information then, the module may either allow the information to be transmitted at that level of security, automatically renegotiate with the web server and the web browser a new appropriate level of security and transmit the information at that level, or prompt the user that the present level of security is unnecessary and invite them to take action.

c) If the security of the link is not sufficient for the nature of the information being transmitted then, the module may either prevent the transmission from taking place and warn the user, automatically renegotiate with the web server and the web browser a new appropriate level of security and then transmit the information at that level, or in the case of an e-mail automatically increase the encryption strength setting, or prompt the user that the present level of security is not sufficient and invite them to confirm that they still wish for transmission to take place.

It will be appreciated that the plug-in module could be configured to respond to a difference in the determined desirable level of security and that being provided in a number of ways and that the actions outlined above are only illustrative.

Further actions that may be taken by the system might include requesting a different web page to be down loaded to the user's machine or modifying the submitted field data such that sensitive information is not transmitted.

Figure 18:
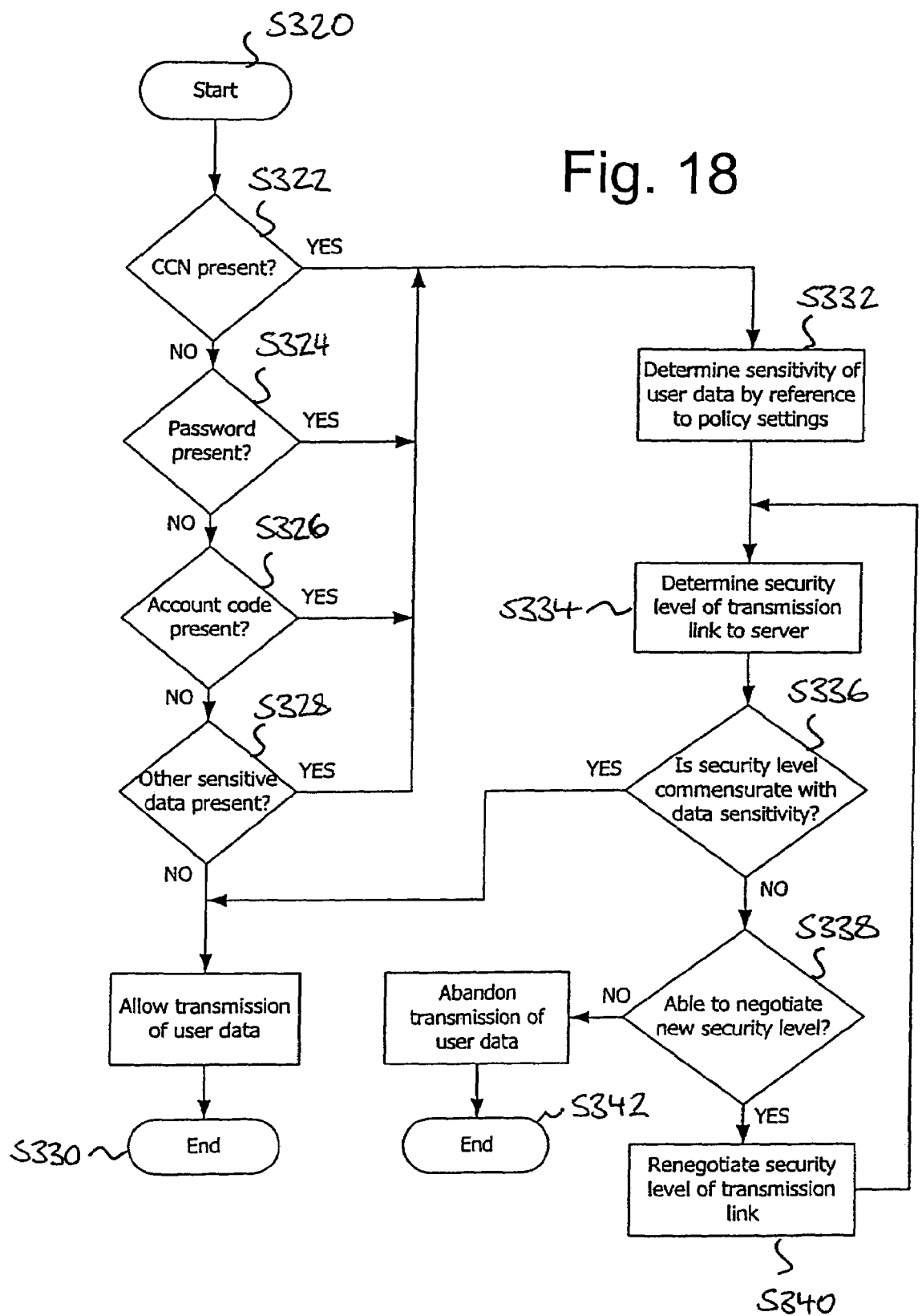
FIG. 18 is an illustration of example policy data specifying the required encryption strength for various data types.

The operation of a browser or e-mail plug in module for monitoring the data being transmitted by a user of the preferred system is illustrated in FIG. 18, to which reference should be made. The module begins operation at step S320 at point C in FIG. 3, just prior to the transmission of the data to a web server or at point B in FIG. 5 just prior to transmission of an e-mail. Control then passes to step S322, in which the module parses the data about to be transmitted and searches for credit card numbers. A possible method for doing this was described earlier with reference to FIG. 8. If no credit card number is detected in the data then control passes to step S314 in which the module searches for passwords in the data about to be transmitted. A method for doing this has been described above, with reference to FIG. 6. If no password is found in the data, then control passes to step S316 in which the module searches for company account or purchase codes in the data. Recognising account or purchase codes may be achieved by storing the codes of the company in a file and attempting to match these codes with any strings of digits found in the outgoing data. If no account code is found then control passes to step S318, where the module searches for indications of other sensitive data in the data to be transmitted. Such indications will need to be defined in advance preferably in a separate file used for detection, and will be dependent on the requirements of the users of the preferred system. Examples might be specified keywords relating to projects the company is undertaking, project titles themselves, personal details address of the recipient of the data, or of the sender, or even the word 'confidential' or 'private' included in the data itself.

If no such indications are found that the data is sensitive and requires stronger protection before it is transmitted, then the transmission is allowed to proceed at the current level of encryption. This may mean that transmission takes place without any encryption being applied.

If however any of the checks in steps S322 to S328 reveal data that is deemed sensitive then control passes to step S332 in which a security rating is assigned to the detected data. This is achieved by comparing the detected data with pre-determined entries in the policy data.

Each entry on the branch of the policy data has a pre-assigned level of encryption which is the minimum level that may be used for transmission of that data. The entries in the table and the assigned level of encryption, as with all the policy settings, are decided by the company using the preferred system in dependence on their requirements. Assigning a security rating is then simply a matter of looking up password, credit card number or other data in the policy data and reading off the corresponding rating. References to tables on a sub branch of the policy data may be used to allocate different encryption strengths to different passwords, credit card numbers and so on.

Once the appropriate security level has been determined in step S332, control passes to step S334 in which the module determines the level of encryption that has been negotiated with the web server to which the data is being transmitted, or is to be used by the e-mail application prior to transmitting the message. This may be achieved by interrogating the web browser or e-mail application, or by setting encryption strength variables at the time the link is established or e-mail encryption requirements determined, both of which will occur prior to transmission.

Control then passes to decision step S336 in which the desired level of security, i.e. the encryption strength, is compared with that determined in the previous step. If the desired level of encryption is lower than or equal to that determined in step S334, then there is deemed to be enough protection for the data to be transmitted and control passes to end step S330, where the module exits. Following step S330, control returns to either point C in FIG. 3 or point B in FIG. 5 depending on whether the module is implemented in a web browser or an e-mail client. Transmission of the data may then proceed in the usual way.

If however in step S336, the desired level of encryption is greater than that currently set, then the module does not allow transmission to go ahead until the proper level of encryption has been negotiated. Control passes to decision step S338 in which the module determines if it is able to increase the encryption strength, and if so passes control to step S340 where a new stronger encrypted link is negotiated, or in the case of an e-mail a higher encryption strength set.

The highest level of encryption that is available depends on the software being used by both the web server and the web browser, or in the case of an e-mail by the sending and receiving e-mail applications. There may then be cases in which the appropriate level of encryption is not available by one party and transmission of the data is never allowed to proceed. Furthermore, certain types of data may be given a security rating that indicates that no level of encryption will ever be high enough to protect it, ie: preventing that data from ever being transmitted.

Having attempted to re-established the link, or changed the e-mail encryption settings, to a higher encryption strength, control passes back to step S334 to ensure the link or settings are now at a suitable strength. If the appropriate encryption level cannot be renegotiated in step S338 or an attempt to increase the encryption strength at step S340 has not been successful, then it is deemed unsafe to transmit the data, and control passes to end step S342 where the module exits. Following exit at step S342, control returns to point A in FIG. 3, or to step S132 in FIG. 5 'compose e-mail', for the user to reconsider and edit or abort the transmission. A suitable message may also be displayed to the user explaining the reasons for the transmission being prevented.

The preferred system therefore provides a way of ensuring that transmission of data is as secure as possible. It precludes the possibility of a user forgetting to secure a transmission, and negotiates a more appropriate level of security if that being used is not sufficient.

Web Browsers may provide similar facilities to warn the user that user entered data is about to be sent over an insecure link or provide facilities to encrypt all messages by default. The preferred system however provides the ability to examine the content of data to be transmitted to determine its security requirement, to allow or prevent transmission based on such security requirements, and on the determined security level of the link (encryption strength). It will be appreciated that the preferred system provides a significantly improved system for secure transmission which reduces the possibility of human error.

Although the implementation of the preferred system has been described with reference to plug-in modules for existing applications, the invention may be implemented by providing web browsers or e-mail clients in which the functionality of the plug-in modules described here is already coded from the outset.

What is claimed:

1. A computer program product for controlling a computer of a plurality of computers adapted for connection to a public computer network to manage information, the computer having access to policy data containing rules specifying an appropriate encryption strength for outbound data transmitted to the public network, the encryption strength depending on the content of the data, comprising:
   a recording medium readable by the computer, having program code recorded thereon which when executed on said computer, configures said computer to:
   determine, in conjunction with an application running on the computer that is operable at least to transmit outbound data to said public network, with reference to said rules in said policy data, an appropriate encryption strength for the outbound data; and
   control the transmission of said outbound data by said application in dependence upon the determination of an appropriate encryption strength.

2. The computer program product of claim 1 wherein said rules in said policy data define confidential data which cannot be transmitted, wherein said program code when executed on said computer is operable to prevent transmission of said confidential data from said application.

3. The computer program product of claim 1 wherein said program code when executed on said computer is further operable to determine the present encryption strength in use for transmitting said outbound data; and to control the transmission of said outbound data from said application in dependence upon both the determination of an appropriate encryption strength and the determination of the present encryption strength in use.

4. The computer program product of claim 3 wherein said program code when executed on said computer is further operable, if it is determined that the present encryption strength in use for transmitting outbound data is less than said appropriate encryption strength, to prevent the transmission of said outbound data from said application.

5. The computer program product of claim 3 wherein said program code when executed on said computer is further operable, if it is determined that the present encryption strength in use for transmitting outbound data is less than said appropriate encryption strength, to negotiate an appropriate encryption strength for transmission of said outbound data before transmission.

6. The computer program product of claim 3 wherein said program code when executed on said computer is further operable, if it is determined that the present encryption strength in use for transmitting outbound data is less than said appropriate encryption strength, to modify the outbound data such that the present encryption strength is an appropriate encryption strength.

7. The computer program product of claim 3 wherein said program code when executed on said computer is further operable, if it is determined that the present encryption strength in use for transmitting outbound data is less than said appropriate encryption strength, to provide notification that the encryption strength in use is not sufficient.

8. The computer program product of claim 1 wherein said program code when executed on said computer is further operable to identify credit card numbers in said outbound data.

9. The computer program product of claim 8 wherein said program code when executed on said computer is further operable to identify a pre-determined set of one or more credit card numbers from other credit card numbers, and wherein said rules of said policy data define a different appropriate encryption strength for outbound data containing credit card numbers in that pre-determined set than for other credit card numbers.

10. The computer program product of claim 9 wherein said rules of said policy data specifies that there is no appropriate encryption strength for said pre-determined set of one or more credit card numbers.

11. The computer program product of claim 1 wherein said program code when executed on said computer is further operable, to identify at least one or more of, credit card numbers, account codes, usernames, passwords, names and addresses and other predetermined keywords in the content of said outbound data.

12. The computer program product of claim 1 wherein said rules in said policy data specify an appropriate encryption strength for said outbound data, that is dependent on the address to which said outbound data is to be transmitted.

13. The computer program product of claim 1 wherein said program code is executable on said computer.

14. The computer program product of claim 1 wherein said application is a web browser.

15. The computer program product of claim 14 wherein said program code when executed on said computer is a plug-in module of said web browser.

16. The computer program product of claim 15 wherein said web browser is an Internet browser and said plug-in module is a Browser Helper Object.

17. The computer program product of claim 1 wherein said application is an e-mail client.

18. The computer program product of claim 17 wherein said program code when executed on said computer is a plug-in module of said e-mail client.

19. The computer program product of claim 18 wherein said plug-in module is an exchange client extension.

20. The computer program product of claim 1 wherein said network includes a server and said program code is executable at a point on said network intermediate said one or more workstations and said server, or program code is executable at said server.

21. A computer program product for controlling a plurality of computers adapted for connection to a private computer network to manage information, the computer network having a data repository arranged to receive data from the plurality of computers, and policy data defining rules for the recording of data that may comprise part of a commercial transaction conducted between a computer of the plurality of computers in the private computer network and a third party across a public computer network, comprising:
   a recording medium readable by a computer, having program code recorded thereon which when executed on each of said plurality of computers configures said computers to:
   analyze, in conjunction with an application running on the computer that is operable to transmit outbound data to said public computer network and receive inbound data from said public computer network, at least one of said outbound data and said inbound data to identify, with reference to said rules of said policy data, the existence of a commercial transaction occurring between the computer and a third party; and
   to control said computer to store transaction data that is all or part of said outbound data or said inbound data related to an identified commercial transaction in said data repository.

22. The computer program product of claim 21 wherein said program code when executed on said computer is operable to identify the existence of a commercial transaction by determining whether a secure link has been negotiated between said application and a remote site on said public network, and whether the outbound data or said inbound data is transmitted on that link.

23. The computer program product of claim 22 wherein said public network is the Internet, and said rules of said policy data define the addresses of non-eCommerce web sites and/or non-eCommerce e-mail accounts, wherein said program code when executed on said computer is operable to disregard any transactions that are identified between the computer and a non-eCommerce web site and/or e-mail account such that no transaction data related to a transaction made to a non-eCommerce web sites or a non-eCommerce e-mail account is stored in the data repository.

24. The computer program product of claim 21 wherein said program code when executed on said computer is operable to identify the existence of a commercial transaction by reference to said rules of said policy data, said rules of said policy data defining the addresses of known eCommerce locations.

25. The computer program product of claim 21 wherein said program code when executed on said computer is operable to identify credit card numbers, and the existence of a commercial transaction is identified by identifying credit card numbers in said outbound data or inbound data.

26. The computer program product of claim 21 wherein said program code when executed on said computer is operable to identify the existence of a commercial transaction by reference to said rules of said policy data, said rules of said policy data defining one or more of pre-determined digital certificates, account codes, pre-determined keywords, pre-determined names and addresses and embedded codes.

27. The computer program product of claim 21 wherein said program code when executed on said computer is operable to identify in said inbound data an embedded code said embedded code having been placed in said inbound data to identify it as transaction data.

28. The computer program product of claim 21 wherein said program code when executed on said computer is operable to identify the existence of a commercial transaction by identifying an electronic receipt in said outbound or inbound data.

29. The computer program product of claim 21 wherein said program code when executed on said computer is further operable to control the computer to record a pre-determined number of subsequent transmissions of said outbound data or said inbound data following an identification of the existence of a commercial transaction, providing that the address or organisation to which the subsequent transmissions are transmitted, or from which they are received, is the same as the address or organisation to which the outbound data was sent or from which the inbound data was received and in which the existence of a commercial transaction was identified.

30. The computer program product of claim 29, wherein said program code when executed on said computer is operable to detect one or more indicators of the nature of the commercial transaction, and said rules of said policy data define the number of subsequent transmissions of said outbound data and said inbound data that are to be recorded in the data repository based on the identified nature of the transaction.

31. The computer program product of claim 29 wherein said rules of said policy data define the number of subsequent transmissions of said outbound and said inbound data that are to be stored in said data repository in dependence on the indicator by which the existence of a commercial transaction was identified.

32. The computer program product of claim 21 wherein said program code when executed on said computer is operable to control the computer to record all subsequent transmissions of said outbound data or said inbound data that occur within a pre-determined amount of time following an identification of the existence of a commercial transaction, providing that the address or organisation to which the subsequent transmissions are transmitted, or from which they are received, is the same as the address or organisation to which the outbound data was transmitted or from which the inbound data was received and in which the existence of a transaction was identified.

33. The computer program product of claim 32 wherein said program code when executed on said computer is operable to detect one or more indicators of the nature of the transaction, and said rules of said policy data define the amount of time for which all subsequent transmissions of said outbound data and said inbound data are to be recorded in said data repository based on the identified nature of the transaction.

34. The computer program product of claim 32 wherein said rules of said policy data define the amount of time for which subsequent transmissions of said outbound and said inbound data are to be stored in said data repository in dependence on the indicator by which the existence of a commercial transaction was identified.

35. The computer program product of claim 21 wherein said program code when executed on said computer is operable to identify the completion of a transaction, and control the computer to store all or part of said outbound data transmitted by said application and all or part of said inbound data received by said application after the existence of a commercial transaction has been identified and before the completion of a transaction has been in identified in said data repository.

36. The computer program product of claim 35 wherein said program code when executed on said computer is operable to identify subsequent related data contained in said outbound data transmitted by said application and said inbound data received by said application after the completion of a transaction, and control the computer to store said subsequent related data in the data repository with said transaction data already identified.

37. The computer program product of claim 36 wherein said program code when executed on said computer is operable to identify said subsequent related data by identifying common indicators in both said transaction data already identified and said outbound data transmitted by said application and said inbound data received by said application after the completion of a transaction has been identified, said common indicators being one or more of the address of the location to which said outbound data is transmitted or from which said inbound data is received, part of the data path to the location to which said outbound data is transmitted or from which said inbound data is received, account code or reference numbers.

38. The computer program product of claim 21 wherein said application is operable such that a user of said application can indicate said outbound and said inbound data that is related to a transaction, said program code when executed on said computer being operable to identify said outbound and said inbound data so indicated.

39. The computer program product of claim 21 wherein said program code when executed on said computer is operable to control the computer to store all of said outbound data and said inbound data in memory as previous data, irrespective of whether it may or may not be part of a transaction and, to retrieve a pre-determined amount of previous data from said outbound data and said inbound data stored in memory if the existence of a commercial transaction is identified, and to control the computer to store said previous data in the data repository with said transaction data.

40. The computer program product of claim 39 wherein said rules of said policy data specify the amount of previous data that is to be retrieved in dependence on the indicator by which the existence of a commercial transaction is identified.

41. The computer program product of claim 39 wherein said public network is the Internet and said application is a web browser, said web browser being operable to store each web page that is viewed by said web browser in memory as previous data.

42. The computer program product of claim 41 wherein said rules of said policy data specify the number of web pages that are to be retrieved from those previously stored in memory in dependence on the indicator by which the existence of a commercial transaction is identified.

43. The computer program product of claim 21 wherein said program code when executed on said computer is further operable to control the computer to store all of said outbound data and said inbound data in memory as previous data, irrespective of whether it may or may not be part of a transaction and, to identify, in said previous data, earlier relevant data that is related to said transaction data already identified, and control the computer to store the earlier relevant data in the data repository with said transaction data.

44. The computer program product of claim 43 wherein said program code when executed on said computer is further operable to identify said earlier relevant data in said previous data, by identifying common indicators in both said transaction data and said previous data, said common indicators being one or more of the address of the location to which said outbound data is transmitted or from which said inbound data is received, part of the data path to the location to which said outbound data is transmitted or said inbound data is received, account codes or reference numbers.

45. The computer program product of claim 21 wherein said program code when executed on said computer is further operable to control the computer to store all of said outbound data and said inbound data in memory as previous data, irrespective of whether it may or may not be part of a transaction; and wherein said computer program product further comprises a selector, recorded on said recording medium, said selector being operable to select earlier relevant data from said previous data in response to input from a user, and wherein said program code when executed on said computer is further operable to control the computer to store said earlier relevant data selected by the user in said data repository together with said transaction data.

46. The computer program product of claim 21 wherein said program code when executed on said computer is operable, once the existence of a transaction has been identified, to determine the nature of said transaction by analysing the content of said outbound and inbound data, said rules of said policy data defining how said transaction data is to be stored in said data repository in dependence on the nature of the transaction that has been determined, said transaction data being stored in said database according to said determination and said rules of said policy data.

47. The computer program product of claim 46 wherein said program code when executed on said computer is further operable to determine the nature of the transaction by identifying in said outbound data and said inbound data one or more indicators, said indicators being defined in said rules of said policy data, and being one or more of: the address of the public network location to which said data that may be part of a transaction is transmitted or from which it is received; part of the data path to the public network location to which said transaction data is transmitted or from which it is received; account codes; reference numbers; credit card numbers; digital certificates and pre-determined keywords.

48. The computer program product of claim 21 wherein said program code when executed on said computer is further operable, once the existence of a commercial transaction has been identified, to identify one or more indicators of the nature of said transaction, and to control the computer to organise the storage of said transaction data by said one or more indicators such that it forms a record.

49. The computer program product of claim 48 wherein said rules of said policy data define said one or more indicators of the nature of a transaction, said indicators being one or more of: the address of the public location to which said transaction data is transmitted or from which it is received; part of the data path to the public location to which said transaction data is transmitted or from which it is received; account codes, reference numbers, credit card numbers, digital certificates and pre-determined keywords.

50. The computer program product of claim 21 wherein the data repository is accessible by one or more of an accounts application, an order processing application or other transaction management application.

51. The computer program product of claim 21 wherein said program code when executed on said computer is further operable to cause any identified relevant data to be encrypted before it is stored in said data repository.

52. The computer program product of claim 21 wherein said program code when executed on said computer is further operable to cause any relevant data stored in the data repository to be encrypted.

53. The computer program product of claim 21 wherein said program code is executable at each of said computers.

54. The computer program product of claim 21 wherein said application is a web browser.

55. The computer program product of claim 54 wherein said program code when executed on said computer is a plug-in module of said web browser.

56. The computer program product of claim 55 wherein said web browser is an Internet browse and said plug-in module is a Browser Helper Object.

57. The computer program product of claim 21 wherein said application is an e-mail client.

58. The computer program product of claim 57 wherein said program code when executed on said computer is a plug-in module of said e-mail client.

59. The computer program product of claim 58 wherein said plug-in module is an exchange client extension.

60. The computer program product of claim 21 wherein said network includes a server and said program code is executable at a point on said network intermediate said one or more workstations and said server, or said program code is executable at said server.

61. The computer program product of claim 21 further comprising program code recorded on the recording medium which when executed on a computer in the plurality of computers enable that computer as a supervisor workstation, said supervisor workstation having access to said data repository and being operable to view said relevant data stored in said data repository.

62. The computer program product of claim 61 wherein said policy data is accessible by said supervisor workstation, such that a user of said supervisor workstation can edit said policy data.

63. A computer program product, for controlling a computer of a plurality of computers to manage information, said plurality of computers being connected to a public computer network and said computer having access to policy data containing rules for identifying in outbound data transmitted to the public computer network transaction data that is part of a commercial transaction; and rules for the transmission of commercial transaction data so identified; comprising:

a recording medium readable by the computer, having program code recorded thereon which when executed on said computer configures the computer to:

analyze, in conjunction with an application running on the computer that is operable to transmit outbound data to the public network and receive inbound data from the public network, at least said outbound data to identify, with reference to said rules of said policy data, commercial transaction data that may be part of a commercial transaction to determine, in accordance with said rules of said policy data, whether the transmission of said commercial transaction data would satisfy said rules; and control the transmission of said commercial transaction data by said application in dependence on the determination made by said analyzer.

64. The computer program product of claim 63 wherein said program code when executed on said computer is operable to control the computer such that said transaction data is either, transmitted, not transmitted, or sent to an approver who determines whether or not to transmit the transaction data.

65. The computer program product of claim 64 wherein the program code when executed on said computer is further operable to identify in said data that may be part of a transaction, data that needs approval; refer said data that needs approval to one or more approvers for approval, and monitor whether or not approval is received from said one or more approvers; and wherein the transmission of said transaction data by said application depends on whether or not approval is received from said one or more approvers.

66. The computer program product of claim 65 wherein said program code when executed on said computer is further operable to identify said transaction data that needs approval by determining the nature of said transaction data and checking said rules of said policy data, said rules of said policy data defining whether or not approval is needed in dependence on the determined nature of said transaction data.

67. The computer program product of claim 65 wherein said program code when executed on said computer is further operable to determine the nature of said transaction data by identifying at least one of the identity of the transmitter of said data, the identity of the intended recipient of said data, the computer in the private network from which said data is to be transmitted, the sum for which a transaction is to be made, and the account from which a transaction is to be made.

68. The computer program product of claim 65 wherein said program code when executed on said computer is further operable to determine the nature of said transaction data that needs approval and select said one of said one or more approvers in dependence on that determination.

69. The computer program product of claim 68 wherein said program code when executed on said computer is operable to determine the nature of said transaction data that needs approval by identifying at least one of the identity of the transmitter of said data, the identity of the intended recipient of said data, the computer in the private network from which said data is to be transmitted, the sum for which a transaction is to be made, and the account from which the transaction is to be made.

70. The computer program product of claim 63 wherein said program code when executed on said computer is operable to determine whether a secure link has been negotiated between said application and a remote site on said public network, and to identify said outbound data or said inbound data as transaction data, if it is transmitted on a secure link.

71. The computer program product of claim 70 wherein said public network is the Internet, and said rules of said policy data define the addresses of web sites or e-mail accounts that negotiate secure links for the transmission of data but which are known not to be eCommerce sites or accounts, and said program code when executed on said computer is operable to disregard said outbound data transmitted to those web sites or accounts or said inbound data received from those web sites or accounts, such that no approval is required.

72. The computer program product of claim 63 wherein said program code when executed on said computer is operable to identify transaction data by reference to said rules of said policy data, said rules of said policy data defining the addresses of known eCommerce web sites and the e-mail accounts.

73. The computer program product of claim 63 wherein said program code when executed on said computer is operable to identify credit card numbers in said outbound data or said inbound data, and to identify outbound data or inbound data that contains a credit card number as transaction data.

74. The computer program product of claim 73 wherein said policy data specifies pre-determined credit card numbers that can never be transmitted.

75. The computer program product of claim 63 wherein said program code when executed on said computer is operable to identify transaction data by reference to said rules of said policy data, said rules of said policy data defining one or more of pre-determined digital certificates, account codes, pre-determined keywords, pre-determined names and addresses and embedded codes.

76. The computer program product of claim 63 wherein said program code when executed on said computer is operable to detect an embedded code in said inbound data, said embedded code having been placed in said inbound data to mark said inbound data as transaction data.

77. The computer program product of claim 63 further comprising, a selector, recorded on said recording medium, said selector being operable to select data in said outbound and said inbound data that is part of a transaction in response to input from a user, said program code when executed on said computer being operable to identify said outbound and said inbound data so selected.

78. The computer program product of claim 63 wherein said program code is executable at said computer.

79. The computer program product of claim 63 wherein said application is a web browser.

80. The computer program product of claim 79 wherein said program code when executed on said computer is a plug-in module of said web browser.

81. The computer program product of claim 80 wherein said web browser is an Internet browser and said plug-in module is a Browser Helper Object.

82. The computer program product of claim 63 wherein said application is an e-mail client.

83. The computer program product of claim 82 wherein said program code when executed on said computer is a plug-in module of said e-mail client.

84. The computer program product of claim 83 wherein said plug-in module is an exchange client extension.

85. The computer program product of claim 63 wherein said public network includes a server and said program code is executable at a point on said network intermediate said computer and said server, or said program code is executable at said server.

86. A computer program product for controlling a computer of a plurality of computers adapted for connection to a public computer network to manage information, said computer having access to policy data containing rules which define whether or not verification is required for a digital certificate used to digitally sign signed data received in inbound data from the public computer network, comprising:
 a recordable medium readable by the computer, having program code recorded thereon which when executed on said computer configures said computer to:
 analyze, in conjunction with an application running on the computer that is operable to receive at least inbound data from the public computer network, signed data that has been digitally signed with a digital certificate, to extract one or more details of said signed data;
 to determine whether or not verification is required for said digital certificate in dependence on said rules of said policy data and in dependence on the one or more extracted details of said signed data; and
 to control the application in dependence on the determination.

87. The computer program product of claim 86 wherein said verification for the digital certificate includes determining whether the digital certificate has been revoked.

88. The computer program product of claim 87 wherein said program code when executed on said computer is further operable to determine whether said signed data is part of an eCommerce transaction, and if it is, to determine the amount of money that is promised in that eCommerce transaction, wherein said verification for the digital certificate also includes determining whether said digital certificate can be taken as a guarantee of receiving the amount of money promised in said eCommerce transaction.

89. The computer program product of claim 86 wherein said one or more details of said signed data, include one or more of said digital certificate holder's identity, the expiry date of said digital certificate, the issue number of said digital certificate, and the domain name from which the signed data was received, and wherein said rules of said policy file define whether or not verification for said digital certificate is required in dependence on the one or more details.

90. The computer program product of claim 86 wherein said program code when executed on said computer is further operable to determine whether or not an eCommerce transaction is occurring, and if it is, to extract as one or more details of said signed data, the amount of any transaction being made with said digital certificate, the account code from which any payment is being made, a credit card number, one or more indicators of the nature of the transaction, and wherein said rules of said policy file define whether or not verification is required for said digital certificate in dependence on said one or more details.

91. The computer program product of claim 90 wherein the program code when executed on said computer is further operable to control the computer to record digital certificates used to digitally sign any signed data received in said inbound data or sufficient descriptive data to identify any such digital certificates, and transaction data describing any transactions made with those digital certificates in a data repository such that a record is maintained of transactions made with a digital certificate; said transaction data being at least one or more of the date of any transactions made with a digital certificate, and the amount of any transaction made with that digital certificate, and wherein said rules of said policy file define whether or not verification for said digital certificate is required in dependence on said transaction data.

92. The computer program product of claim 86 wherein said program code when executed on said computer is further operable to control the computer to store digital certificates used to sign signed data in said inbound data or digital certificates transmitted in said inbound data and storing said digital certificates or sufficient descriptive data to identify said digital certificates in a data repository.

93. The computer program product of claim 92 wherein said program code when executed on said computer is further operable to control the computer to record the results of any verification for an identified digital certificate in said data repository together with said identified digital certificate.

94. The computer program product of claim 93 wherein said program code when executed on said computer is operable to determine whether said identified digital certificate has been previously stored in said data repository, and if it has been previously stored, to look-up the results of any previous verification for said identified digital certificate, wherein the determination of whether or not verification is required for said identified digital certificate is dependent on said results of any previous verification for said identified digital certificate.

95. The computer program product of claim 86 wherein said program code when executed on said computer is operable to determine whether or not a digital certificate has been revoked, and control said application to prevent said inbound data being viewed by a user of said application if said identified digital certificate has been revoked.

96. The computer program product of claim 86 wherein said program code when executed on said computer is operable to determine whether or not a digital certificate has been revoked, and to control said application to notify a user of said application that said inbound data is not to be relied upon if said identified digital certificate has been revoked.

97. The computer program product of claim 86 wherein said program code is executable at said computer.

98. The computer program product of claim 86 wherein said application is a web browser.

99. The computer program product of claim 98 wherein said program code when executed on said computer is a plug-in module of said web browser.

100. The computer program product of claim 99 wherein said web browser is an Internet browser and said plug-in module is a Browser Helper Object.

101. The computer program product of claim 86 wherein said application is an e-mail client.

102. The computer program product of claim 101 wherein said program code when executed on said computer is a plug-in module of said e-mail client.

103. The computer program product of claim 102 wherein said plug-in module is a an exchange client extension.

104. The computer program product of claim 86 wherein said network includes a server and said program code is executable at a point on said network intermediate said computer and said server, or said program code is executable at said server.

105. The computer program product of claim 1 wherein the determination and control steps are carried out by means of at least one analyser integrated into said application.

106. The computer program product of claim 105 wherein the at least one analyser executes said determination and control steps as transmission of the outbound data is initiated.

107. The computer program product of claim 1 wherein the policy data is centrally defined for the plurality of computers.

108. The computer program product of claim 21 wherein the analysis and control steps are carried out by means of at least one analyser integrated into said application.

109. The computer program product of claim 108 wherein the at least one analyser executes said analysis and control steps as transmission of the outbound data is initiated, or after said inbound data is received by the application and before it is viewed by a user of the application.

110. The computer program product of claim 21 wherein the policy data is centrally defined for the plurality of computers.

111. The computer program product of claim 63 wherein the analysis and control steps are carried out by means of at least one analyser integrated into said application.

112. The computer program product of claim 111 wherein the at least one analyser executes said analysis and control steps as transmission of the outbound data is initiated, or after said inbound data is received by the application and before it is viewed by a user of the application.

113. The computer program product of claim 21 wherein the policy data is centrally defined for the plurality of computers.

114. The computer program product of claim 86 wherein the analysis, determination and control steps are carried out by means of at least one analyser integrated into said application.

115. The computer program product of claim 114 wherein the at least on analyser executes said analysis, determination and control steps after said inbound data is received by the application, and before it is viewed by a user of the application.

116. The computer program product of claim 21 wherein the policy data is centrally defined for the plurality of computers.

* * * * *

UNITED STATES PATENT AND TRADEMARK OFFICE
CERTIFICATE OF CORRECTION

PATENT NO.      : 7,669,227 B2                                        Page 1 of 1
APPLICATION NO. : 11/127675
DATED           : February 23, 2010
INVENTOR(S)     : Peter Bryan Malcolm It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1146 days.

Signed and Sealed this

Seventh Day of December, 2010

David J. Kappos
*Director of the United States Patent and Trademark Office*